US011455620B2

(12) United States Patent
Rule et al.

(10) Patent No.: US 11,455,620 B2
(45) Date of Patent: Sep. 27, 2022

(54) TAPPING A CONTACTLESS CARD TO A COMPUTING DEVICE TO PROVISION A VIRTUAL NUMBER

(71) Applicant: Capital One Services, LLC, McLean, VA (US)

(72) Inventors: Jeffrey Rule, Chevy Chase, MD (US); Colin Hart, Arlington, VA (US); Kaitlin Newman, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/731,835

(22) Filed: Dec. 31, 2019

(65) Prior Publication Data

US 2021/0201296 A1    Jul. 1, 2021

(51) Int. Cl.
*G06Q 20/34*    (2012.01)
*G06Q 20/36*    (2012.01)
(Continued)

(52) U.S. Cl.
CPC .......... *G06Q 20/353* (2013.01); *G06F 21/31* (2013.01); *G06Q 20/3674* (2013.01);
(Continued)

(58) Field of Classification Search
CPC ...... G06Q 20/123; G06Q 30/06; G06Q 20/06; G06Q 20/4016; G06Q 20/405;
(Continued)

(56) References Cited

U.S. PATENT DOCUMENTS 4,683,553 A    7/1987 Mollier
4,827,113 A    5/1989 Rikuna
(Continued)

FOREIGN PATENT DOCUMENTS

CA    3010336 A1    7/2017
CN    101192295 A    6/2008
(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Johann Y Choo
(74) *Attorney, Agent, or Firm* — KDB

(57) ABSTRACT

Systems, methods, articles of manufacture, and computer-readable media for tapping a contactless card to a computing device to provision a virtual number. At least one parameter for authorizing a virtual account number for a subaccount associated with a primary account may be received. An application executing on a processor circuit may receive authentication credentials for the primary account. A card reader may receive encrypted data from a communications interface of a contactless card. The application may transmit the encrypted data to an authentication server. The application may receive verification of the encrypted data from the authentication server. The application may provide the at least one parameter for authorizing the virtual account number and receive a virtual account number for the subaccount generated by a virtual card number server, the virtual account number restricted to a spending limit based on the amount parameter associated with the virtual account number.

20 Claims, 16 Drawing Sheets

(51) Int. Cl.
  *G06Q 20/38* (2012.01)
  *G06Q 20/40* (2012.01)
  *G06F 21/31* (2013.01)
  *H04L 9/40* (2022.01)

(52) U.S. Cl.
  CPC ....... *G06Q 20/3829* (2013.01); *G06Q 20/405* (2013.01); *H04L 63/0428* (2013.01); *H04L 63/0884* (2013.01); *G06Q 2220/00* (2013.01)

(58) Field of Classification Search
  CPC .... G06Q 30/0201; G06Q 20/14; G06Q 20/40; G06Q 20/20; G06Q 20/3823
  See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,917,168 A * | 6/1999 | Nakamura ......... G06Q 20/3572 235/379 |
| 5,929,413 A | 7/1999 | Gardner |
| 5,960,411 A | 9/1999 | Hartman et al. |
| 5,984,180 A | 11/1999 | Albrecht |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,784,685 B1 | 8/2010 | Hopkins, III |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |

(56) References Cited

U.S. PATENT DOCUMENTS

| | | |
|---|---|---|
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,916,608 B1 | 3/2018 | Ramalingam et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,277,586 B1* | 4/2019 | Yau ................ H04L 63/0807 |
| 10,510,074 B1 | 12/2019 | Rule et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0184145 A1 | 8/2005 | Law et al. |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |

(56) References Cited

U.S. PATENT DOCUMENTS

| | | | |
|---|---|---|---|
| 2006/0064378 A1* | 3/2006 | Clementz | G06Q 20/04 |
| | | | 705/40 |
| 2006/0085848 A1 | 4/2006 | Aissi et al. | |
| 2006/0136334 A1 | 6/2006 | Atkinson et al. | |
| 2006/0173985 A1 | 8/2006 | Moore | |
| 2006/0174331 A1 | 8/2006 | Schuetz | |
| 2006/0242698 A1 | 10/2006 | Inskeep et al. | |
| 2006/0280338 A1 | 12/2006 | Rabb | |
| 2007/0033642 A1 | 2/2007 | Ganesan et al. | |
| 2007/0055630 A1 | 3/2007 | Gauthier et al. | |
| 2007/0061266 A1 | 3/2007 | Moore et al. | |
| 2007/0061487 A1 | 3/2007 | Moore et al. | |
| 2007/0116292 A1 | 5/2007 | Kurita et al. | |
| 2007/0118745 A1 | 5/2007 | Buer | |
| 2007/0197261 A1 | 8/2007 | Humbel | |
| 2007/0198432 A1* | 8/2007 | Pitroda | G06Q 20/327 |
| | | | 705/64 |
| 2007/0224969 A1 | 9/2007 | Rao | |
| 2007/0241182 A1 | 10/2007 | Buer | |
| 2007/0256134 A1 | 11/2007 | Lehtonen et al. | |
| 2007/0258594 A1 | 11/2007 | Sandhu et al. | |
| 2007/0278291 A1 | 12/2007 | Rans et al. | |
| 2008/0008315 A1 | 1/2008 | Fontana et al. | |
| 2008/0011831 A1 | 1/2008 | Bonalle et al. | |
| 2008/0014867 A1 | 1/2008 | Finn | |
| 2008/0035738 A1 | 2/2008 | Mullen | |
| 2008/0071681 A1 | 3/2008 | Khalid | |
| 2008/0072303 A1 | 3/2008 | Syed | |
| 2008/0086767 A1 | 4/2008 | Kulkarni et al. | |
| 2008/0103968 A1 | 5/2008 | Bies et al. | |
| 2008/0109309 A1 | 5/2008 | Landau et al. | |
| 2008/0110983 A1 | 5/2008 | Ashfield | |
| 2008/0120711 A1 | 5/2008 | Dispensa | |
| 2008/0156873 A1 | 7/2008 | Wilhelm et al. | |
| 2008/0162312 A1 | 7/2008 | Sklovsky et al. | |
| 2008/0164308 A1 | 7/2008 | Aaron et al. | |
| 2008/0207307 A1 | 8/2008 | Cunningham, II et al. | |
| 2008/0209543 A1 | 8/2008 | Aaron | |
| 2008/0223918 A1 | 9/2008 | Williams et al. | |
| 2008/0285746 A1 | 11/2008 | Landrock et al. | |
| 2008/0308641 A1 | 12/2008 | Finn | |
| 2009/0037275 A1 | 2/2009 | Pollio | |
| 2009/0048026 A1 | 2/2009 | French | |
| 2009/0132417 A1 | 5/2009 | Scipioni et al. | |
| 2009/0143104 A1 | 6/2009 | Loh et al. | |
| 2009/0171682 A1 | 7/2009 | Dixon et al. | |
| 2009/0210308 A1 | 8/2009 | Toomer et al. | |
| 2009/0235339 A1 | 9/2009 | Mennes et al. | |
| 2009/0249077 A1 | 10/2009 | Gargaro et al. | |
| 2009/0254440 A1 | 10/2009 | Pharris | |
| 2009/0282264 A1 | 11/2009 | Ameil et al. | |
| 2010/0023449 A1 | 1/2010 | Skowronek et al. | |
| 2010/0023455 A1 | 1/2010 | Dispensa et al. | |
| 2010/0029202 A1 | 2/2010 | Jolivet et al. | |
| 2010/0033310 A1 | 2/2010 | Narendra et al. | |
| 2010/0036769 A1 | 2/2010 | Winters et al. | |
| 2010/0078471 A1 | 4/2010 | Lin et al. | |
| 2010/0082491 A1 | 4/2010 | Rosenblatt et al. | |
| 2010/0094754 A1 | 4/2010 | Bertran et al. | |
| 2010/0095130 A1 | 4/2010 | Bertran et al. | |
| 2010/0100480 A1 | 4/2010 | Altman et al. | |
| 2010/0114731 A1 | 5/2010 | Kingston et al. | |
| 2010/0192230 A1 | 7/2010 | Steeves et al. | |
| 2010/0207742 A1 | 8/2010 | Buhot et al. | |
| 2010/0211797 A1 | 8/2010 | Westerveld et al. | |
| 2010/0240413 A1 | 9/2010 | He et al. | |
| 2010/0257357 A1 | 10/2010 | McClain | |
| 2010/0312634 A1 | 12/2010 | Cervenka | |
| 2010/0312635 A1 | 12/2010 | Cervenka | |
| 2011/0028160 A1 | 2/2011 | Roeding et al. | |
| 2011/0035604 A1 | 2/2011 | Habraken | |
| 2011/0060631 A1 | 3/2011 | Grossman et al. | |
| 2011/0068170 A1 | 3/2011 | Lehman | |
| 2011/0084132 A1 | 4/2011 | Tofighbakhsh | |
| 2011/0101093 A1 | 5/2011 | Ehrensvard | |
| 2011/0113245 A1 | 5/2011 | Varadarajan | |
| 2011/0125638 A1 | 5/2011 | Davis et al. | |
| 2011/0131415 A1 | 6/2011 | Schneider | |
| 2011/0153437 A1 | 6/2011 | Archer et al. | |
| 2011/0153496 A1 | 6/2011 | Royyuru | |
| 2011/0208658 A1 | 8/2011 | Makhotin | |
| 2011/0208965 A1 | 8/2011 | Machani | |
| 2011/0211219 A1 | 9/2011 | Bradley et al. | |
| 2011/0218911 A1 | 9/2011 | Spodak | |
| 2011/0238564 A1 | 9/2011 | Lim et al. | |
| 2011/0246780 A1 | 10/2011 | Yeap et al. | |
| 2011/0258452 A1 | 10/2011 | Coulier et al. | |
| 2011/0280406 A1 | 11/2011 | Ma et al. | |
| 2011/0282785 A1 | 11/2011 | Chin | |
| 2011/0294418 A1 | 12/2011 | Chen | |
| 2011/0312271 A1 | 12/2011 | Ma et al. | |
| 2012/0024947 A1 | 2/2012 | Naelon | |
| 2012/0030047 A1 | 2/2012 | Fuentes et al. | |
| 2012/0030121 A1 | 2/2012 | Grellier | |
| 2012/0047071 A1 | 2/2012 | Mullen et al. | |
| 2012/0079281 A1 | 3/2012 | Lowenstein et al. | |
| 2012/0109735 A1 | 5/2012 | Krawczewicz et al. | |
| 2012/0109764 A1 | 5/2012 | Martin et al. | |
| 2012/0143754 A1 | 6/2012 | Patel | |
| 2012/0150737 A1 | 6/2012 | Rottink et al. | |
| 2012/0178366 A1 | 7/2012 | Levy et al. | |
| 2012/0196583 A1 | 8/2012 | Kindo | |
| 2012/0207305 A1 | 8/2012 | Gallo et al. | |
| 2012/0209773 A1 | 8/2012 | Ranganathan | |
| 2012/0238206 A1 | 9/2012 | Singh et al. | |
| 2012/0239560 A1 | 9/2012 | Pourfallah et al. | |
| 2012/0252350 A1 | 10/2012 | Steinmetz et al. | |
| 2012/0254394 A1 | 10/2012 | Barras | |
| 2012/0284194 A1 | 11/2012 | Liu et al. | |
| 2012/0290472 A1 | 11/2012 | Mullen et al. | |
| 2012/0296818 A1 | 11/2012 | Nuzzi et al. | |
| 2012/0316992 A1 | 12/2012 | Oborne | |
| 2012/0317035 A1 | 12/2012 | Royyuru et al. | |
| 2012/0317628 A1 | 12/2012 | Yeager | |
| 2013/0005245 A1 | 1/2013 | Royston | |
| 2013/0008956 A1 | 1/2013 | Ashfield | |
| 2013/0026229 A1 | 1/2013 | Jarman et al. | |
| 2013/0043976 A1* | 2/2013 | Creguer | G07C 9/00309 |
| | | | 340/5.65 |
| 2013/0048713 A1 | 2/2013 | Pan | |
| 2013/0054474 A1 | 2/2013 | Yeager | |
| 2013/0055202 A1* | 2/2013 | Dudek | G06F 8/61 |
| | | | 717/120 |
| 2013/0065564 A1 | 3/2013 | Conner et al. | |
| 2013/0080228 A1 | 3/2013 | Fisher | |
| 2013/0080229 A1 | 3/2013 | Fisher | |
| 2013/0099587 A1 | 4/2013 | Lou et al. | |
| 2013/0104251 A1 | 4/2013 | Moore et al. | |
| 2013/0106576 A1 | 5/2013 | Hinman et al. | |
| 2013/0119130 A1 | 5/2013 | Braams | |
| 2013/0130614 A1 | 5/2013 | Busch-Sorensen | |
| 2013/0144793 A1 | 6/2013 | Royston | |
| 2013/0171929 A1 | 7/2013 | Adams et al. | |
| 2013/0179351 A1 | 7/2013 | Wallner | |
| 2013/0185772 A1 | 7/2013 | Jaudon et al. | |
| 2013/0191279 A1 | 7/2013 | Calman et al. | |
| 2013/0200999 A1 | 8/2013 | Spodak et al. | |
| 2013/0216108 A1 | 8/2013 | Hwang et al. | |
| 2013/0226791 A1 | 8/2013 | Springer et al. | |
| 2013/0226796 A1 | 8/2013 | Jiang et al. | |
| 2013/0232082 A1 | 9/2013 | Krawczewicz et al. | |
| 2013/0238894 A1 | 9/2013 | Ferg et al. | |
| 2013/0262317 A1* | 10/2013 | Collinge | G06Q 20/3823 |
| | | | 705/71 |
| 2013/0282360 A1 | 10/2013 | Shimota et al. | |
| 2013/0303085 A1 | 11/2013 | Boucher et al. | |
| 2013/0304651 A1 | 11/2013 | Smith | |
| 2013/0312082 A1 | 11/2013 | Izu et al. | |
| 2013/0314593 A1 | 11/2013 | Reznik et al. | |
| 2013/0344857 A1 | 12/2013 | Berionne et al. | |
| 2014/0002238 A1 | 1/2014 | Taveau et al. | |
| 2014/0019352 A1 | 1/2014 | Shrivastava | |
| 2014/0027506 A1 | 1/2014 | Heo et al. | |
| 2014/0032409 A1 | 1/2014 | Rosano | |

(56) References Cited

U.S. PATENT DOCUMENTS

| | | |
|---|---|---|
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0061301 A1* | 3/2014 | Cho .................. G06Q 20/3229 235/380 |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032626 A1* | 1/2015 | Dill ..................... G06Q 20/4016 705/44 |
| 2015/0032635 A1 | 1/2015 | Guise |
| 2015/0071486 A1 | 3/2015 | Rhoads et al. |
| 2015/0082326 A1* | 3/2015 | Milliron .............. G06F 11/3065 719/318 |
| 2015/0088757 A1 | 3/2015 | Zhou et al. |
| 2015/0089586 A1 | 3/2015 | Ballesteros |
| 2015/0121464 A1 | 4/2015 | Hughes, Jr. et al. |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0220963 A1* | 8/2015 | Priebatsch ......... G06Q 30/0268 705/14.38 |
| 2015/0254665 A1* | 9/2015 | Bondesen .......... G06Q 20/3672 705/44 |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012432 A1 | 1/2016 | Meshkati et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267262 A1 | 9/2016 | Taniguchi |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0068960 A1* | 3/2017 | Kwak .................. G06Q 20/02 |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0323297 A1 | 11/2017 | Shanmugam |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0218345 A1 | 8/2018 | Spratt et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0164158 A1 | 5/2019 | Koeppel et al. |
| 2019/0238517 A1 | 8/2019 | D'Agostino et al. |
| 2019/0354979 A1* | 11/2019 | Crawford ............ G06Q 20/227 |
| 2020/0027083 A1 | 1/2020 | Patrni et al. |

FOREIGN PATENT DOCUMENTS

| | | | |
|---|---|---|---|
| CN | 103023643 A | 4/2013 | |
| CN | 103417202 A | 12/2013 | |
| EP | 1085424 A1 | 3/2001 | |
| EP | 1223565 A1 | 7/2002 | |
| EP | 1265186 A2 | 12/2002 | |
| EP | 1783919 A1 | 5/2007 | |
| EP | 2139196 A1 | 12/2009 | |
| EP | 1469419 A1 | 8/2012 | |
| EP | 2852070 A1 | 3/2015 | |
| EP | 3258373 A1 * | 12/2017 | ......... G06F 13/4282 |
| EP | 3343488 A1 | 7/2018 | |
| GB | 2457221 A | 8/2009 | |
| GB | 2516861 A | 2/2015 | |
| GB | 2551907 A | 1/2018 | |

(56) References Cited

FOREIGN PATENT DOCUMENTS

| | | |
|---|---|---|
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-infomnation-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_V4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail—Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved an Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.PIatform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

(56) References Cited

OTHER PUBLICATIONS

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for International Patent Application No. PCT/US2020/061930 dated Feb. 18, 2021, 10 pages.

International Search Report and Written Opinion for International Patent Application No. PCT/US2020/040261 dated Sep. 28, 2020, 13 pages.

\* cited by examiner

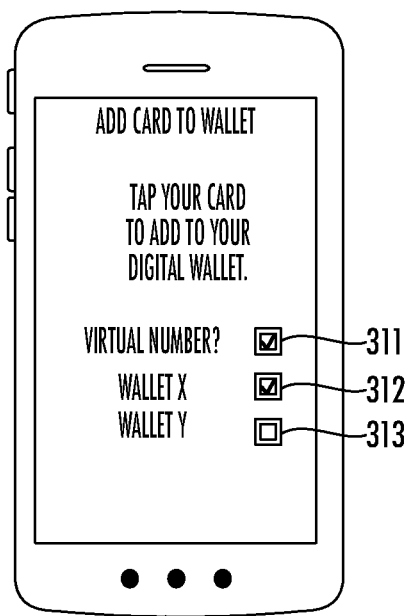
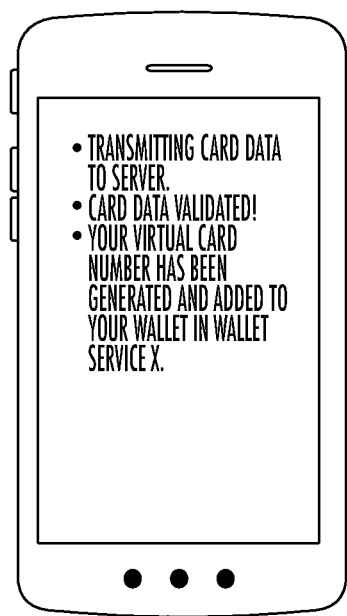
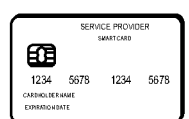
FIG. 3B
FIG. 3C

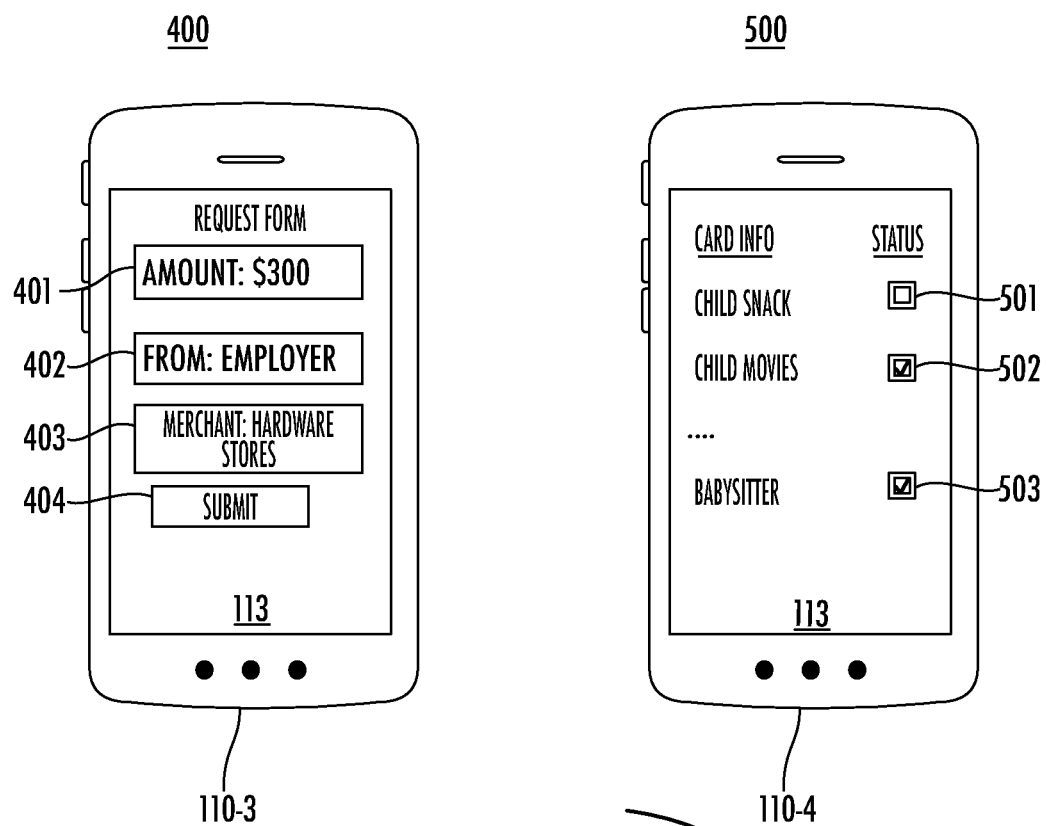
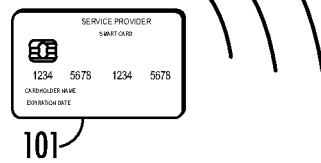
FIG. 4
FIG. 5

TAPPING A CONTACTLESS CARD TO A COMPUTING DEVICE TO PROVISION A VIRTUAL NUMBER

TECHNICAL FIELD

Embodiments herein generally relate to computing platforms, and more specifically, to tapping a contactless card to a computing device to provision a virtual number.

BACKGROUND

Cardholders (e.g., credit card holders, bank card holders, etc.) often obtain additional physical cards for trusted individuals, such as family members, employees, and the like. However, obtaining additional physical cards is impractical in many situations. For example, it is impractical to obtain additional physical cards that have nominal spending limits. Similarly, it is impractical to obtain additional physical cards for users who make infrequent purchases or to deactivate and/or reactivate existing physical cards for such users.

SUMMARY

Embodiments disclosed herein provide systems, methods, articles of manufacture, and computer-readable media for tapping a contactless card to a computing device to provision a virtual number. According to one example, at least one parameter for authorizing a virtual account number for a subaccount associated with a primary account may be received, the at least one parameter comprising an amount parameter associated with the virtual account number. An application executing on a processor circuit may receive authentication credentials for the primary account. A card reader may receive encrypted data from a communications interface of a contactless card associated with the primary account, the encrypted data generated by an applet executing in a memory of the contactless card using a cryptographic algorithm and a private key stored in the memory of the contactless card. The application may transmit the encrypted data to an authentication server associated with an issuer of the contactless card. The application may receive verification of the encrypted data from the authentication server, the authentication server to verify the encrypted data based on the cryptographic algorithm and an instance of the private key stored in a memory of the authentication server. The application may provide the at least one parameter for authorizing the virtual account number and receive a virtual account number for the subaccount generated by a virtual card number server, the virtual account number restricted to a spending limit based on the amount parameter associated with the virtual account number.

BRIEF DESCRIPTION OF THE DRAWINGS

FIGS. 3A-3D illustrate embodiments of tapping a contactless card to a computing device to provision a virtual number.

FIG. 4 illustrates an embodiment of an interface for requesting to provision a virtual number.

FIG. 5 illustrates an embodiment of an interface to manage provisioned virtual numbers.

DETAILED DESCRIPTION

Figure 1A:
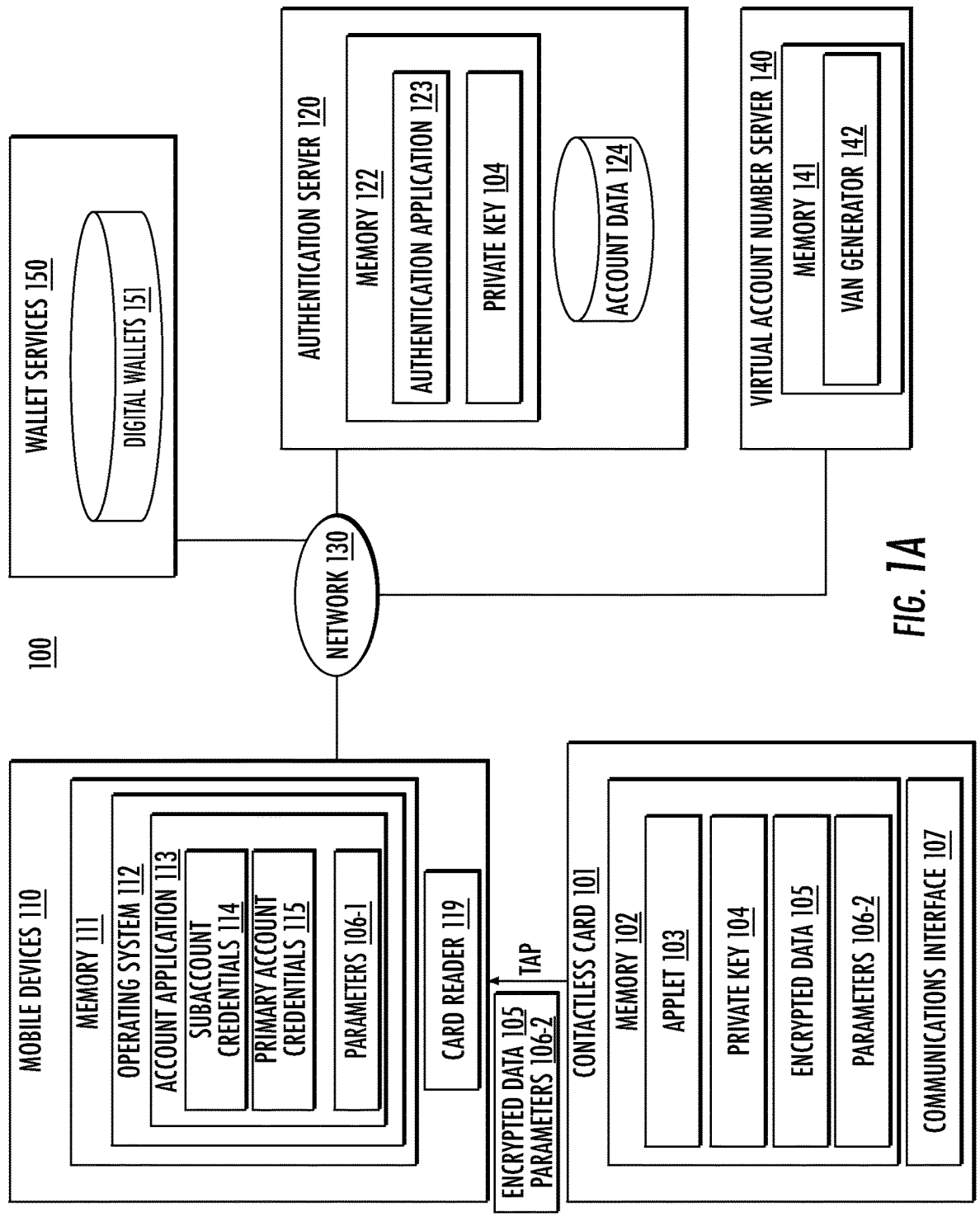
FIGS. 1A-1C illustrate embodiments of a system to tap a contactless card to a computing device to provision a virtual number.

Embodiments disclosed herein provide secure techniques to tap a contactless card to a computing device to provision a virtual account number from one account (referred to herein as a "primary account") to one or more other accounts (referred to herein as "subaccounts"). Generally, a user may provide input to an application executing on a computing device specifying the parameters for the virtual account number. For example, the user may specify to generate a $20 virtual account number for a child to be used within one week at a general store. The user may then tap their contactless card to the computing device, which may cause the contactless card to come within communications range of the computing device. Doing so causes the contactless card to generate encrypted data which is transmitted to the computing device. The application may receive the encrypted data generated by the contactless card and transmit the encrypted data to an authentication server for validation. Once validated, the authentication server may instruct a virtual account number server to generate a virtual account number, an expiration date, and a card verification value (CVV) account associated with the contactless card. The generated virtual account number (which includes the expiration date and/or CVV) may then be transmitted to the device of the user and/or the recipient of the virtual account number. The virtual account number may also be added to a digital wallet of the recipient. The recipient may then use the virtual account number based on the input parameters. For example, the child may have one week to spend the $20 allocated to the virtual account number at the general store.

Advantageously, embodiments disclosed herein improve the security of all devices and associated data. For example, by eliminating the need for physical cards, the risks associated with physical cards are avoided. Furthermore, the validation performed by the authentication server provides safeguards to ensure that an authorized user who has access to the physical card is requesting to generate the virtual account number. Further still, by enforcing rules associated with the generation of the virtual account number, the security of the account authorizing the generation of the virtual account number is preserved.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more computing devices 110, an authentication server 120, a virtual account number server 140, and one or more wallet services 150. The contactless cards 101 are representative of any type of payment cards, such as a credit card, debit card, ATM card, gift card, and the like. The contactless cards 101 may comprise one or more communications interfaces 107, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The computing devices 110 are representative of any type of network-enabled computing devices, such as smartphones, tablet computers, wearable devices, laptops, portable gaming devices, mobile devices, workstations, desktop computers, servers, and the like. The servers 120, 140 and wallet service 150 are representative of any type of computing device, such as a server, workstation, compute cluster, cloud computing platform, virtualized computing system, and the like.

As shown, a memory 111 of the computing device 110 includes an instance of an operating system (OS) 112. Example operating systems 112 include the Android® OS, iOS®, macOS®, Linux®, and Windows® operating systems. As shown, the OS 112 includes an account application 113. The account application 113 allows users to perform various account-related operations, such as viewing account balances, purchasing items, processing payments, and virtual number generation and management. Initially, a user may authenticate using authentication credentials to access certain features of the account application 113. For example, the authentication credentials may include a username and password, biometric credentials (e.g., fingerprints, Face ID, etc.), and the like. As shown, the account application 113 may receive primary account credentials 114 for a primary account and/or subaccount credentials 115 for a subaccount.

Generally, a user associated with the primary account may use the account application 113 to generate a virtual account number for a subaccount according to one or more parameters 106-1 specified by the user. Similarly, a user associated with a subaccount may use the account application to request generation of a virtual account number from the primary account according to one or more parameters 106-1 specified by the user associated with the subaccount (which may be modified and/or accepted by the user of the primary account). However, in some embodiments, one or more of the parameters 106-2 stored in the memory 102 of the contactless card 101 may be used to generate the virtual account number (e.g., as default parameters that may be automatically populated in a form of the account application 113). Generally, by provisioning a virtual account number, the user of the primary account allocates funds and/or extends credit to the user of the subaccount. In at least one embodiment, the subaccount is the generated virtual account number.

For example, an employer (as primary account holder) may desire to allocate a virtual account number to an employee (as a subaccount holder) to allow the employee to purchase $2,000 worth of office furniture from one or more merchants who sell office furniture. The employer may provide the primary account credentials 115 to authenticate the primary account in the account application 113. The employer may then enter the parameters 106-1 in a form of the account application 113. The parameters 106-1 may include indications of the subaccount (or a recipient of the subaccount, if the subaccount does not exist), an amount for the virtual account number, a period of time the virtual account number can be used, and one or more merchants the virtual account number can be used. In some embodiments, the employee may provide the subaccount credentials 114 to the account application 113 to process provisioning of the virtual account number.

In response, the account application 113 may output a notification on the computing device 110 (which may be of the primary account holder and/or the subaccount holder). The notification may instruct the user to tap the contactless card 101 of the primary account holder to the computing device 110, thereby bringing the contactless card 101 sufficiently close to the card reader 119 of the computing device 110 to enable data transfer (e.g., NFC data transfer, Bluetooth data transfer, etc.) between the communications interface 107 of the contactless card 101 and the card reader 119 of the computing device 110. The applet 103 executing on a processor (not pictured) of the contactless card 101 may then generate and transmit encrypted data 105 to the computing device 110 via the communications interface 107. For example, the applet 103 of the contactless card 101 may use a cryptographic algorithm to generate a cryptographic payload of encrypted data 105 based at least in part on the private key 104 stored in the memory 102 of the contactless card 101. In such an embodiment, the private key 104 and some other piece of data (e.g., a customer identifier, an account identifier, etc.) may be provided as the input to the cryptographic algorithm, which outputs the encrypted data 105. Generally, the applet 103 may use any type of cryptographic algorithm and/or system to generate the encrypted data 105, and the use of a specific cryptographic algorithm as an example herein should not be considered limiting of the disclosure.

In some embodiments, the applet 103 may perform encryption using a key diversification technique to generate the encrypted data 105. For example, the applet may use the private key 105 in conjunction with a counter value to enhance security using key diversification. The counters may comprise values that are synchronized between the contactless card 101 and server 120. The counter value may comprise a number that changes each time data is exchanged between the contactless card 101 and the server 120 (and/or the contactless card 101 and the mobile device 110). When preparing to send data (e.g., to the server 120 and/or the mobile device 110), the contactless card 101 may increment the counter value. The contactless card 101 may then provide the master key 105 and the counter value as input to a cryptographic algorithm, which produces a diversified key as output. The diversified key may then be used to generate the encrypted data 105. The server 120 may then encrypt the private key 104 and the counter value to generate an instance of the diversified key, and decrypt the encrypted data 105 using the diversified key. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

In some embodiments, the computing device 110 may transmit a device identifier to the applet 103. The device identifier may be any identifier such as a media access control (MAC) address, unique device identifier, a software fingerprint of applications installed on the computing device 110, etc. In some such embodiments, the applet 103 determines whether the received device identifier matches (or is like) one or more permitted device identifiers stored in the parameters 106-2. If the received identifier is a match, the applet 103 may generate the encrypted data 105. If the received identifier is not a match, to preserve security, the applet 103 may refrain from generating the encrypted data 105. Furthermore, the applet 103 may apply other rules in the parameters 106-2 when determining whether to generate the encrypted data 105. For example, the parameters 106-2 may specify a threshold number of permitted virtual account numbers, and the applet 103 may determine whether the generation of an additional virtual account number would exceed the threshold. As another example, the computing device 110 may transmit the parameters 106-1 specified by the user. If the parameters 106-1 specified by the user exceed a corresponding threshold in the parameters 106-2, the applet 103 may refrain from generating the encrypted data 105. For example, if the dollar amount specified as a parameter 106-1 exceeds a maximum dollar amount specified in the parameters 106-2, the applet may refrain from generating the encrypted data 105.

Once generated, the applet 103 may transmit the encrypted data 105 to the account application 113 of the computing device 110, e.g., via NFC. In some embodiments, the applet 103 may also transmit one or more parameters from the parameters 106-2 to the account application 113. The account application 113 may transmit the encrypted data 105 and the parameters 106 (which may include one or more of the parameters 106-1 and/or one or more of the parameters 106-2) to the authentication application 123 of the authentication server 120. The parameters 106 may include, without limitation, a primary account identifier, a subaccount identifier, a value for the virtual account, any restrictions, etc. In some embodiments, the account application 113 may determine whether the parameters 106 specified for generation of the virtual account number are permitted (e.g., based on one or more rules as described above) prior to transmitting the encrypted data 105 and/or the parameters 106 to the authentication server 120. For example, if the requested dollar amount exceeds a threshold value, the account application 113 may reject the request to generate the virtual account number. As another example, if the requested location is not located within one or more permitted areas specified in the parameters 106, the account application 113 may reject the request to generate the virtual account number. In some embodiments, the account application 113 transmits additional data to the authentication application 123 (e.g., the device identifier of the computing device 110, etc.).

Figure 1B:
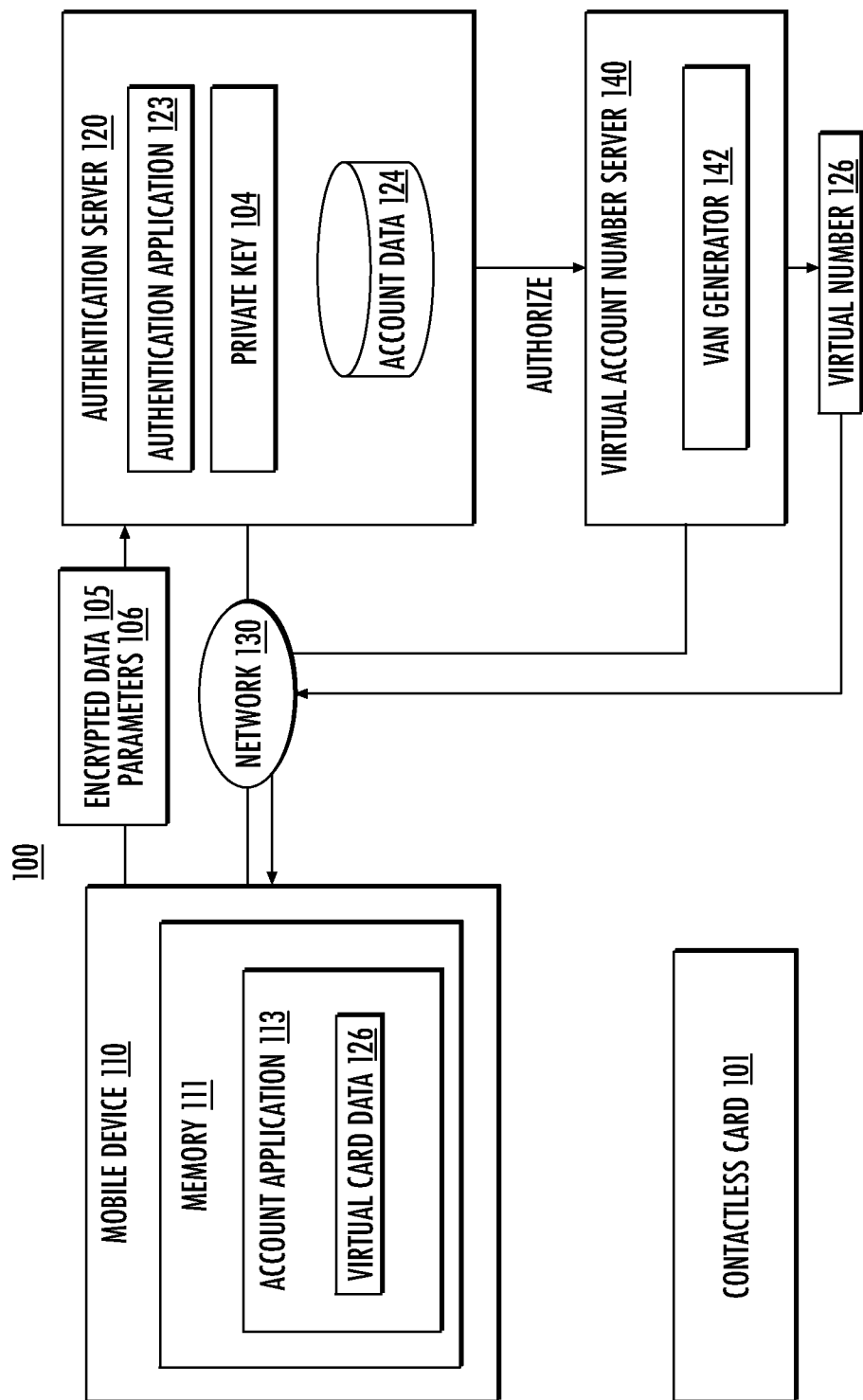

FIG. 1B illustrates an embodiment where the account application 113 transmits the encrypted data 105 and parameters 106 to the authentication server 120. Once received, the authentication application 123 may authenticate the encrypted data 105. For example, the authentication application 123 may attempt to decrypt the encrypted data 105 using a copy of the private key 104 stored in the memory 122 of the authentication server 120. The private key 104 may be identical to the private key 104 stored in the memory 102 of the contactless card 101, where each contactless card 101 is manufactured to include a unique private key 104 (and the authentication server 120 stores a corresponding copy of each unique private key 104). Therefore, the authentication application 123 may successfully decrypt the encrypted data 105, thereby verifying the encrypted data 105. Although the private key 104 is depicted as being stored in the memory 122, the private key 104 may be stored elsewhere, such as in a secure element and/or a hardware security module (HSM). In such embodiments, the secure element and/or the HSM may decrypt the encrypted data 105 using the private key 104 and a cryptographic function.

For example, as stated, the customer identifier (e.g., of the primary account) may be used to generate the encrypted data 105. In such an example, the authentication application 123 may decrypt the encrypted data 105 using the private key 104 of the authentication server 120. If the result of the decryption yields the customer identifier associated with the primary account in the account data 124, the authentication application 123 verifies the encrypted data 105 and instructs the VAN generator 142 to generate a virtual account number 126 (including an expiration date and CVV) for the account associated with the contactless card 101. If the authentication application 123 is unable to decrypt the encrypted data to yield the expected result (e.g., the customer identifier of the primary account associated with the contactless card 101), the authentication application 123 does not validate the encrypted data 105. Due to the failed verification, the authentication application 123 does not instruct the VAN generator 142 to generate a virtual account number to preserve the security of the primary account.

In some embodiments, the authentication application 123 processes data received from the computing device 110 as a condition to instructing the VAN generator 142 to generate the virtual account number. For example, as with the applet 103 and/or the account application 113, the authentication application 123 may confirm whether the parameters 106 for generating the virtual account number conform with one or more rules (e.g., in the account data 124, the parameters 106-1, and/or 106-2). For example, if the requested dollar amount exceeds a threshold, the authentication application 123 may reject the request to generate the virtual account number. As another example, the authentication application 123 may determine whether the device identifier of the computing device 110 is specified as a known device identifier for the associated account in the account data 124. If the device identifier is not a known identifier, the authentication application 123 may refrain from instructing the VAN generator 142 to generate the virtual account number. Otherwise, the authentication application 123 may instruct the VAN generator 142 to generate the virtual account number. As another example, the authentication application 123 may determine whether the software fingerprint matches a known software fingerprint for the associated account in the account data 124. If the software fingerprint is not a known software fingerprint, the authentication application 123 may refrain from instructing the VAN generator 142 to generate the virtual account number. Otherwise, the authentication application 123 may instruct the VAN generator 142 to generate the virtual account number. As yet another example, the authentication application 123 may determine whether the GPS coordinates of the device 110 indicate the user is at home, at work, or some other known address associated with the account in the account data 124. If the location of the device 110 is not within a threshold distance of the known address, the authentication application 123 may refrain from instructing the VAN generator 142 to generate the virtual account number. Otherwise, the authentication application 123 may instruct the VAN generator 142 to generate the virtual account number. As yet another example, the authentication application 123 may determine whether the GPS coordinates of the requested location to use the virtual account number are within one or more permitted locations specified in the account data 124. For example, if the requested location is within 1 mile of the home address associated with the account, and the account data 124 restricts the use of virtual card numbers to 4 miles from the home address, the authentication application 123 may instruct the VAN generator 142 to generate the virtual account number. If, however, the requested location is not within one or more permitted locations, the authentication application 123 may refrain from instructing the VAN generator 142 to generate the virtual account number.

As shown in FIG. 1B, once the authentication application 123 validates the encrypted data 105, the authentication application 123 instructs the virtual account number (VAN) generator 142 in the memory 141 of the virtual account number server 140 to generate a virtual account number 126, which may include a virtual account number, expiration date, and CVV for the subaccount. In at least one embodiment, the virtual account number generated by the VAN generator 142 is restricted to one or more merchants specified in the parameters 106. The virtual account number may further include other restrictions (e.g., time restrictions, amount restrictions, location restrictions, etc.) specified by the parameters 106. For example, the virtual account number may be restricted by a location restriction defining one or more locations the virtual account number may be used. Once generated, the VAN generator 142 may transmit the virtual account number 126 (including the expiration date and/or CVV) to the account application 113 of computing device 110 (which may be the computing device 110 of the primary account holder and/or the subaccount holder). The VAN generator 142 may further transmit the virtual account number 126 to the authentication server 120. The authentication server 120 may then store the virtual account number 126 in the profile for the subaccount in the account data 124. Doing so allows the subaccount user to access the virtual account number 126 remotely.

Figure 1C:
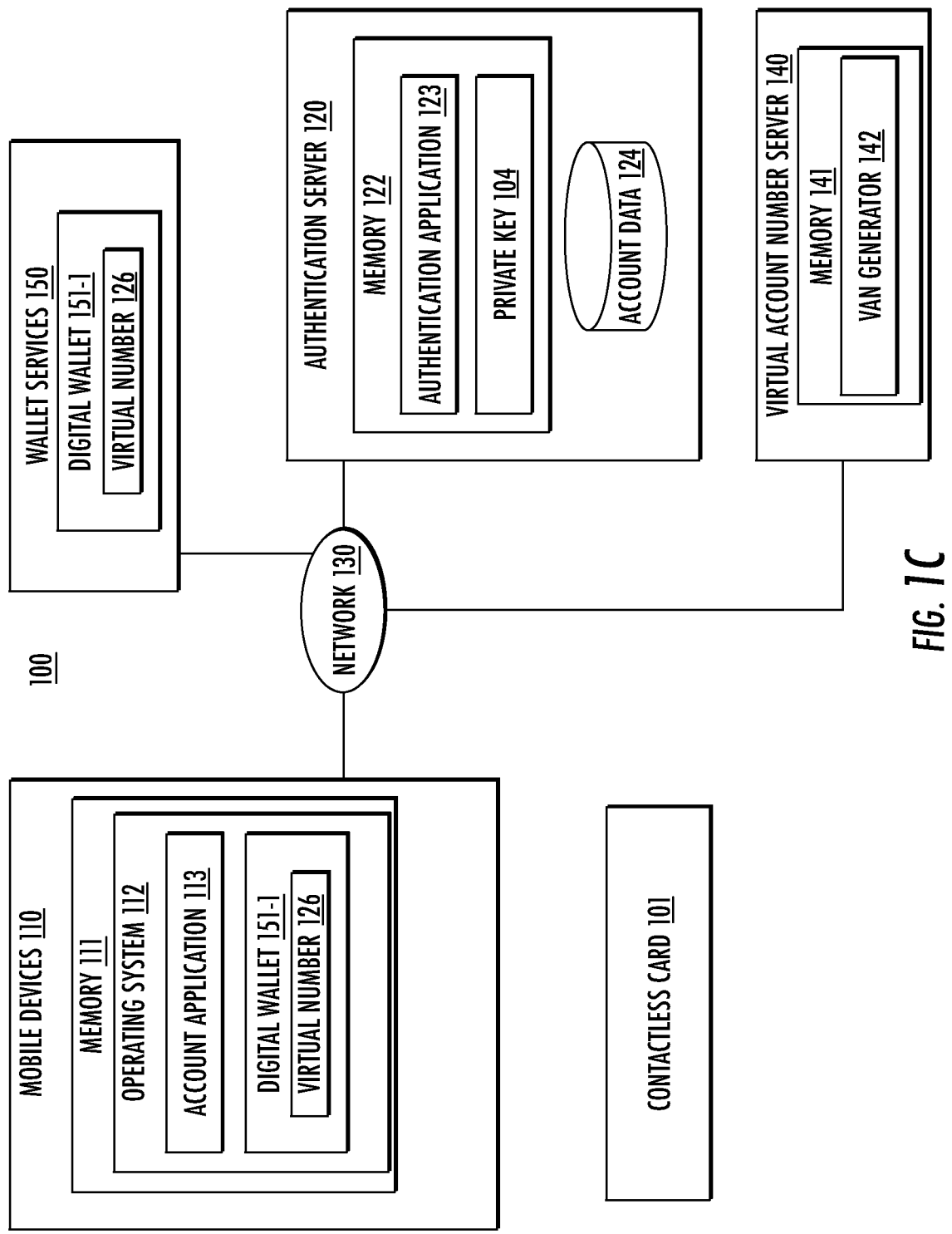

FIG. 1C depicts an embodiment where the virtual account number 126 (including the expiration date and/or CVV) generated by the VAN generator 142 is added to a digital wallet 151-1 of the subaccount holder. As shown, the virtual account number 126 may be stored in a digital wallet 151-1 in the wallet service 150 and/or the device 110. For example, the VAN generator 142 may provide the virtual account number 126 to an application program interface (API) of the wallet service 150 and/or the digital wallet 151-1. The API of the wallet service 150 and/or the digital wallet 151-1 may then add the virtual account number, CVV, and expiration date, to the digital wallet 151-1 of the subaccount user. The subaccount user may then use the virtual account number 126 in the digital wallet 151-1 as a form of payment. However, as stated, in some embodiments, the virtual account number 126 may be used as a form of payment without adding the virtual account number 126 to a digital wallet.

In some embodiments, the account number, expiration date, and CVV of the contactless card 101 may be added to the digital wallet 151-1 responsive to a tap of the contactless card 101 to the device 110, subject to verification of the encrypted data 105 generated by the contactless card 101 by the authentication server 120. In such embodiments, the authentication server 120 may provide the account number, expiration date, and CVV of the contactless card 101 to the wallet service 150 along with the account holder's name and addresses. The name and address may be received from the contactless card 101 and/or the account data 124. In another embodiment, the authentication server 120 informs the device 110 that the encrypted data 105 has been verified. The digital wallet 151-1 of the device 110 may then add the account number, expiration date, and CVV of the contactless card 101 to the digital wallet 151-1 of the user (e.g., by communicating with the wallet service 150). The account holder's name and address may further be added to the digital wallet 151-1. The name and address may be received from the contactless card 101 and/or from the account data 124 of the authentication server 120.

Generally, once generated, the virtual account number 126 may be used in accordance with the restrictions specified by the parameters 106. For example, if the parameters 106 limit the virtual account number 126 to a $50 spending limit at restaurants within 1 mile of a corporate office for one year, each attempt to use the virtual account number 126 as a form of payment will be analyzed according to the parameters 106. For example, if an employee attempts to spend $75 at a restaurant 10 miles from the corporate office using the virtual account number 126, the payment may be declined due to the spending and location restrictions being violated. If, however, the employee attempts to spend $10 at a restaurant 0.5 miles from the corporate office 1 week after the virtual account number 126 is generated, the payment may be processed using the virtual account number 126.

Although depicted as being added via the wallet service 150 and/or the digital wallet 151-1, virtual account numbers (including expiration date, CVV, or any other account related data) may be transmitted and/or added using other techniques. For example, the virtual account numbers may be transmitted via email, text message, or any other technique. Furthermore, in one or more embodiments, the OS 112 and/or the account application 113 may detect the receipt of the virtual account numbers (e.g., virtual account number 126, expiration date, CVV, and/or any other data). For example, the OS 112 and/or the account application 113 may analyze the text of an email, text message, push notification, etc., to detect the virtual account number, CVV, expiration date, and/or other account related data. As another example, the account application 113 may receive an indication from the contactless card 101 that a data payload being transmitted includes virtual account number, expiration date, CVV, billing address, etc.

Responsive to detecting the receipt of a virtual account number (e.g., from the VAN generator 142 and/or the contactless card 101), the OS 112 and/or the account application 113 may perform any number of operations. For example, the OS 112 and/or the account application 113 may output a notification suggesting that the virtual account number be used, e.g., to complete a mobile payment. Additionally and/or alternatively, the OS 112 and/or the account application 113 may provide a selectable option (e.g., a link, button, etc.) that allows the virtual account number, expiration date, and/or CVV to be copied to a clipboard of the OS 112. Additionally and/or alternatively, the OS 112 and/or the account application 113 may autofill the virtual account number, expiration date, and/or CVV to one or more detected form fields of a form (e.g., into one or more payment fields of a form in the account application 113, OS 112, the wallet service 150, the digital wallet 151, the web browser 203, etc.). In some embodiments, the OS 112 and/or the account application 113 may autofill the data responsive to receiving user input specifying to autofill (e.g., via a link and/or button specifying to perform the autofill that may be selected by the user). More generally, any type of operation may be performed responsive to receiving a virtual account number, CVV, expiration date, and/or any other account related data.

Figure 2A:
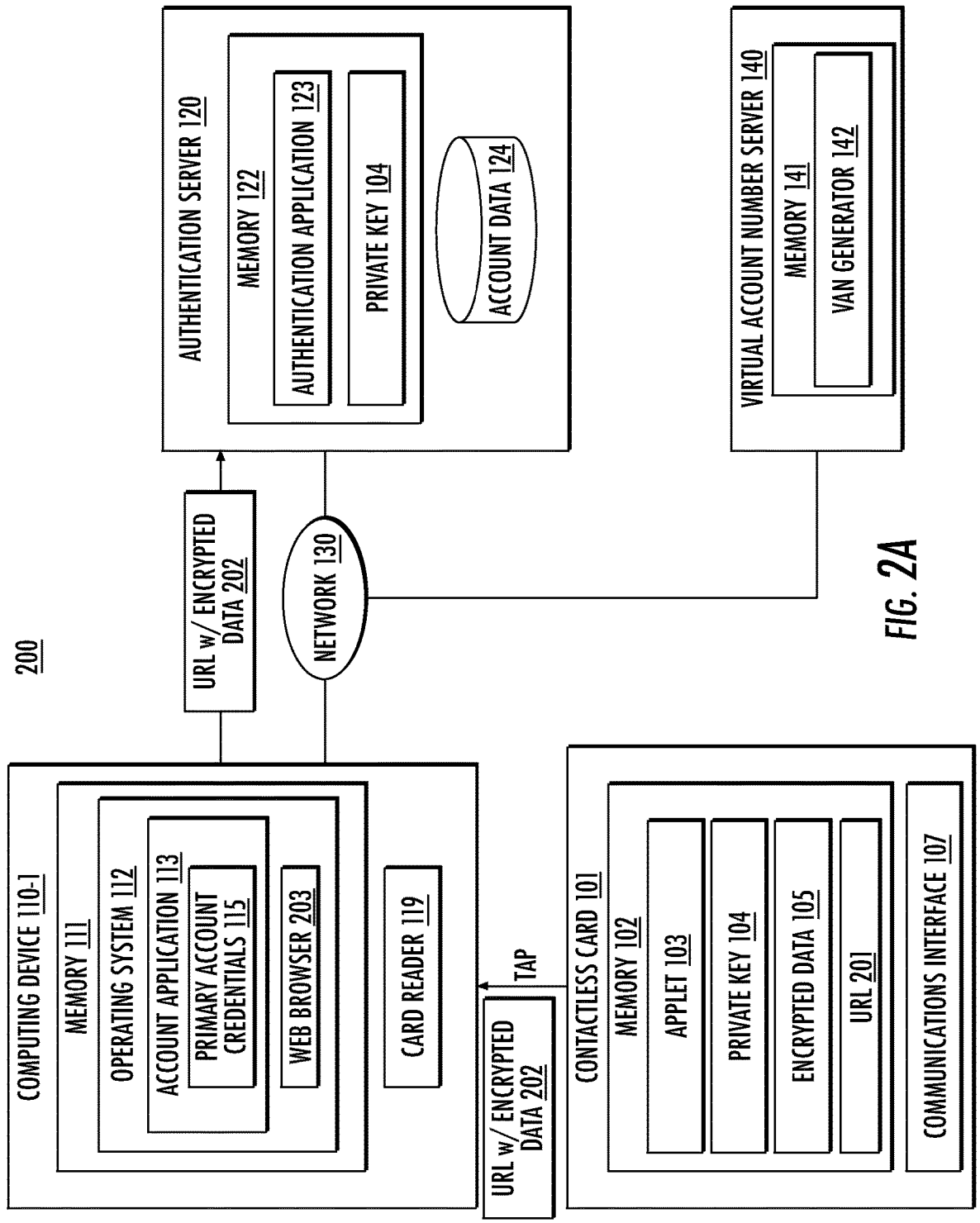
FIGS. 2A-2B illustrate embodiments of tapping a contactless card to a computing device to provision a virtual number.

FIG. 2A is a schematic 200 depicting an example embodiment of tapping the contactless card 101 to provision a virtual card number without requiring the recipient to authenticate in the account application 113. As shown, the account application 113 may receive the primary account credentials 115 from the user associated with the primary account. The user may further specify parameters 106-1 via the account application 113, e.g., indicating the recipient of the virtual card number, the associated amount, and/or any restrictions. As stated, in some embodiments, one or more parameters 106-2 are received from the contactless card 101. Once the parameters 106 are submitted, the account application 113 instructs the user of the primary account to tap the contactless card 101 to the computing device 110 to provision the virtual card number.

As stated, once the user taps the contactless card 101 to the computing device 110, the contactless card 101 generates the encrypted data 105. However, as shown, the memory 102 of the contactless card 101 includes a uniform resource locator (URL) 201. The URL 201 may be stored in the memory 102 and/or may be generated by the applet 103. The URL 201 may be directed to the authentication server 120, or some other URL associated with an entity issuing the contactless card 101. The URL 201 may further include data (e.g., parameters) used by the authentication server 120 to validate the data generated by the contactless card 101. For example, the applet 103 of the contactless card 101 may include the encrypted data 105 as a parameter of the URL.

In some embodiments, the encrypted data 105 may be a string of characters, for example, "ABC123". The applet 103 may include the generated encrypted data 105 as a parameter of the URL 201, thereby generating a URL with encrypted data 202. For example, the URL 201 to the authentication server 120 may be "http://www.example.com/". Therefore, the URL with encrypted data 202 may be "http://www.example.com/? ABC123". In some embodiments, the applet 103 may encode the encrypted data 105 according to an encoding format compatible with URLs prior to including the encrypted data 105 as a parameter of the URL 201. For example, the encrypted data 105 may be a string of binary data (e.g., zeroes and ones), which may not be compatible with URLs. Therefore, the applet 103 may encode the encrypted data 105 to the American Standard Code for Information Interchange (ASCII) base64 encoding format. Doing so represents the binary encrypted data 105 in an ASCII string format by translating it into a radix-64 representation (e.g., "ABC123" in the previous example).

Once generated, the applet 103 may transmit the URL with encrypted data 202 to the mobile device 110, e.g., via NFC. In one embodiment, when received by the OS 112, the OS 112 causes a web browser 203 to access the URL with encrypted data 202. Doing so causes information describing the mobile device 110 to be sent with the request to access the URL with encrypted data 202. For example, the information may include attributes of the mobile device 110, such as the media access control (MAC) address, unique device identifier, and/or the software fingerprint of applications installed on the computing device 110. The account application 113 may further include the parameters 106, e.g., a primary account identifier, subaccount identifier, amount value, any restrictions, and the like in the URL with encrypted data 202.

In some embodiments, the URL 201 is a universal link that opens one or more pages of the account application 113. For example, the page for specifying the parameters 106 may be loaded when the URL 201 is received. As another example, a login page for receiving the primary account credentials 115 may be loaded when the URL 201 is received. Once the web browser 203 accesses the URL with encrypted data 202, the authentication server 120 and/or the authentication application 123 may extract the encrypted data 105 from the URL with encrypted data 202.

The authentication application 123 may then attempt to decrypt the encrypted data 105 using the private key 104 associated with the contactless card 101 of the primary account. As stated, in some embodiments, the encrypted data 105 is encoded by the applet 103. In such embodiments, the authentication application 123 may decode the encrypted data 105 prior to the attempted decryption. If the authentication application 123 is unable to decrypt the encrypted data to yield an expected result (e.g., a customer identifier of the primary account, etc.), the authentication application 123 does not validate the encrypted data 105 and does not instruct the VAN generator 142 to generate a virtual account number. If the authentication application 123 decrypts the encrypted data to yield an expected result (e.g., the customer identifier of the primary account, etc.), the authentication application 123 validates the encrypted data 105, and instructs the VAN generator 142 to generate a virtual account number, expiration date, and CVV value. The authentication application 123 may further include an indication of the parameters 106 received from the account application 113 (e.g., a primary account identifier, subaccount identifier, amount value, any restrictions, etc.).

Figure 2B:
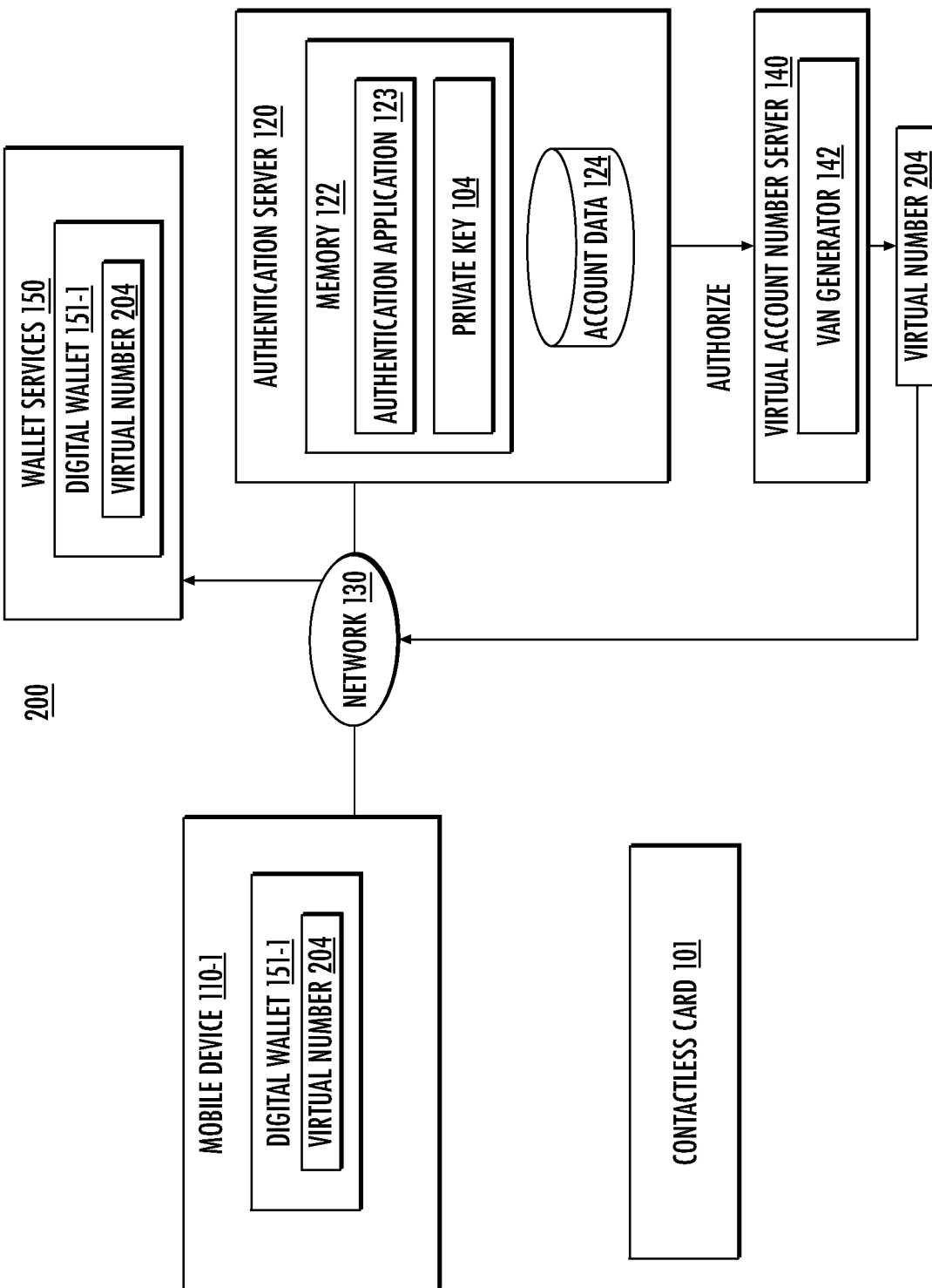

FIG. 2B depicts an embodiment where the authentication application 123 verifies the encrypted data 105 extracted from the URL with encrypted data 202. In response, the VAN generator 142 generates a virtual account number 204 comprising the virtual account number, expiration date, and CVV value. As stated, the virtual account number 204 may be generated based on the parameters 106. Therefore, the virtual account number 204 may be associated with the subaccount holder and be limited to the amount specified in the parameters 106. The virtual account number 204 may further be limited in duration, limited to a type of merchant, to one or more specific merchants, to one or more geographic locations, etc., based on the parameters 106. The VAN generator 142 may then transmit the virtual account number 204 to an API of the wallet service 150, which may add the virtual account number 204 to the digital wallet 151-1 of the subaccount holder. As another example, the VAN generator 142 may transmit the virtual account number 204 to the computing device, which may add the virtual account number 204 to the digital wallet 151-1 of the subaccount holder.

Figure 3A:
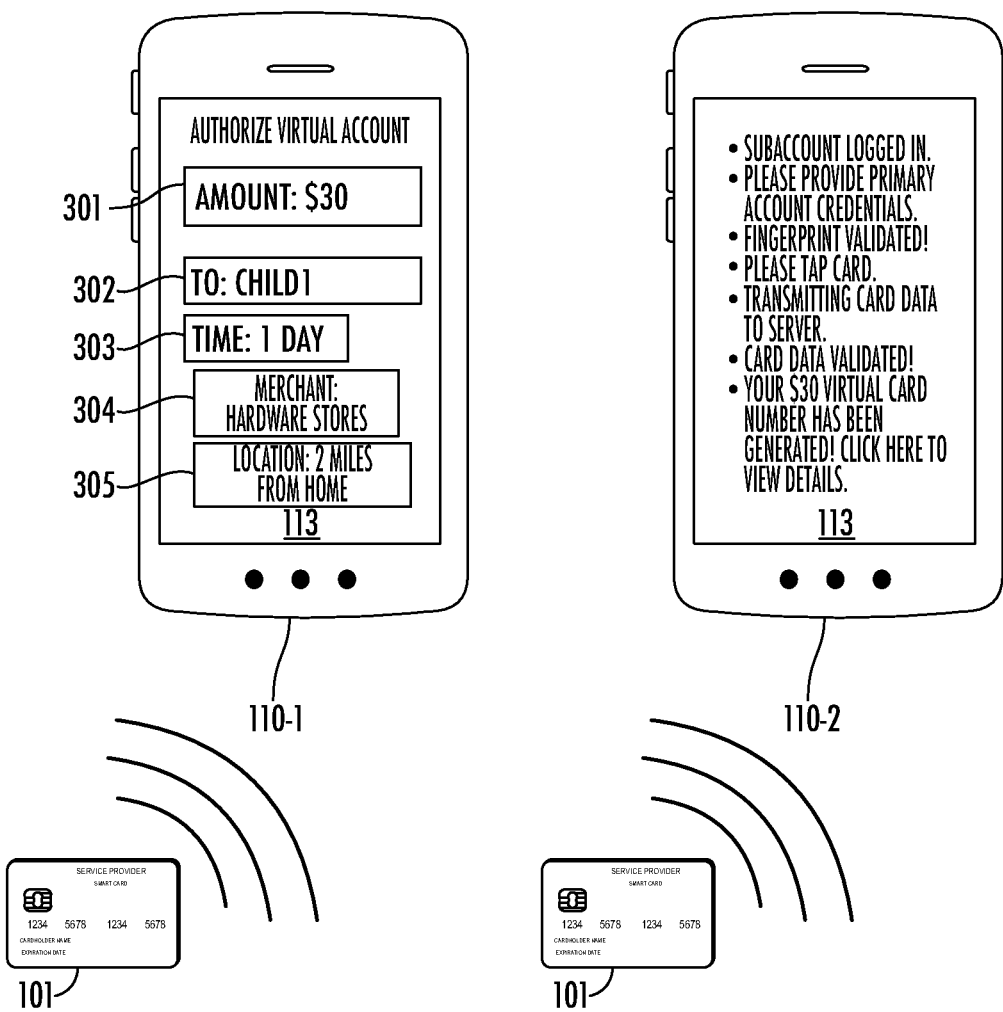

FIG. 3A is a schematic 300 illustrating an example of tapping the contactless card 101 to provision a virtual card number. As shown, the account application 113 executing on a computing device 110-1 outputs a graphical user interface (GUI) for receiving parameters 106. Illustratively, the GUI includes form fields 301-305, where field 301 corresponds to an amount field, field 302 corresponds to a recipient field (e.g., the subaccount), field 303 corresponds to a duration for using the virtual card number, field 304 corresponds to a merchant field, and field 305 corresponds to a location field. The form fields may be completed by the requesting user as part of a request for a virtual card number and/or by the primary account holder as part of a grant of a virtual card number. The example depicted in FIG. 3A corresponds to an embodiment where the primary account holder completes the form fields 301-304. As shown, the primary account holder user has entered an amount of $30 in field 301, an example recipient "child1" in field 302, a duration of one day in field 303, an example merchant category of hardware stores in field 304, and an example location of 2 miles from home.

Once the form in the account application 113 on the device 110-1 is submitted, the account application 113 transmits a request to the device 110-2 of the subaccount holder. In one embodiment, the account application 113 transmits the request to the authentication server 120, which may then transmit the request to the device 110-2 of the subaccount holder. Generally, the request includes the parameters 106 (e.g., at least indications of the values entered in form fields 301-305 and/or other parameters resolved based on the values entered in the form fields 301-305. As shown, the account application 113 on the computing device 110-2 has received authentication credentials for the subaccount. In addition, the account application 113 on the computing device 110-2 requires credentials for the primary account (a fingerprint in this example). The account application 113 on the computing device 110-2 may then instruct the primary account holder to tap the contactless card 101 to the computing device 110-2. The applet 103 of the contactless card 101 may then generate and transmit encrypted data 105 to the computing device 110-2. The account application 113 on computing device 110-2 may then transmit the encrypted data 105 to the authentication server 120 along with the parameters 106 (e.g., the values from the form fields 301-304). The authentication server 120 may then validate the encrypted data 105 and instruct the VAN generator 142 to generate a virtual account number, expiration date, and CVV subject to the restrictions specified by the parameters 106. The VAN generator 142 may then transmit the generated virtual account number to the computing device 110-2 of the subaccount holder. The subaccount holder may then view the generated virtual account number and/or otherwise use the virtual account number as a form of payment.

FIG. 3B is a schematic 310 illustrating an example of tapping the contactless card 101 to add an account number to a digital wallet 151. As shown, the computing device 110-1 outputs a GUI specifying to tap the contactless card to add a card to a digital wallet. The GUI may be part of the account application 113 and/or a different application (e.g., a GUI provided by one or more wallet services 150). As shown, the GUI provides the user with an option to specify whether to add a virtual account number, e.g., by checking the checkbox 311. If the user selects the checkbox 311, a virtual account number generated by the VAN generator 142 may be added to the corresponding wallet 151. If the user does not select the checkbox 311, the card number associated with the contactless card may be added to the corresponding wallet 151. Furthermore, as shown, the GUI includes checkboxes 312-313 to allow the user to specify which wallets 151 the account number should be added to. For example, as shown, the user has selected checkbox 312, but not checkbox 313. Therefore, the account number may be added to the example wallet 151 of "wallet x", but not "wallet y". The different wallets "wallet x" and "wallet y" may be provided by the same wallet service 150 and/or different wallet services 150.

Once the user taps the contactless card 101 to the device 110-1, the applet 103 of the contactless card 101 may then generate and transmit encrypted data 105 to the computing device 110-1. The computing device 110-1 may then transmit the encrypted data 105 to the authentication server 120. In some embodiments, the applet 103 transmits additional data to the computing device 110-1 (e.g., the account number of the contactless card 101, the expiration date of the contactless card 101, the CVV of the contactless card 101, the name of the account holder, and one or more addresses of the account holder). In such embodiments, the computing device 110-1 may transmit the additional data to the authentication server 120. The computing device 110-1 may further transmit, to the authentication server 120, whether the user specified to generate a virtual account number and indications of each selected wallet (e.g., generate a virtual account number for wallet x).

The authentication application 123 may then validate the encrypted data 105 as described above. In one embodiment, the authentication application 123 may transmit the account number, expiration date, and CVV of the contactless card 101 to the wallet service 150 for addition to the specified wallet 151. The authentication application 123 may further provide additional information to the wallet service 150 for addition to the wallet 151, e.g., a name and/or addresses to be associated with the virtual account number. The name and/or addresses may be received from the contactless card 101 and/or received from the account data 124 by the authentication application 123. In another embodiment, the authentication application 123 may transmit an indication of the validation of the encrypted data to the device 110-1, where the user may use a GUI provided by the wallet service 150 to add the account number to the wallet 151. In such embodiments, the authentication application 123 may optionally transmit the account number, expiration date, CVV, name, and/or addresses to the device 110-1.

If the user specified to generate a virtual account number via the GUI in FIG. 3B, the authentication application 123 may validate the encrypted data 105 and instruct the VAN generator 142 to generate a virtual account number, expiration date, and CVV. The VAN generator 142 may then generate the virtual account number, expiration date, and CVV. In one embodiment, the VAN generator 142 may transmit the virtual account number, expiration date, and CVV to the wallet service 150. The VAN generator 142 may specify an identifier of the wallet 151 the virtual account number, expiration date, and CVV should be added to by the wallet service 150. The VAN generator 142 may further provide additional information to the wallet service 150 for addition to the wallet 151, e.g., a name and/or addresses to be associated with the virtual account number. The name and/or addresses may be received from the contactless card 101 and/or received from the account data 124 (e.g., by the VAN generator 142 and/or the authentication application 123). In another embodiment, the VAN generator 142 transmits the generated virtual account number, expiration date, and CVV to the device 110-1, where the user may use the GUI provided by the wallet service 150 to add the virtual account number to the wallet 151. In such embodiments, the VAN generator 142 may optionally transmit the account holder name, and/or addresses to the device 110-1.

FIG. 3C is a schematic 315 depicting an embodiment where the VAN generator 142 directly added a virtual account number to the user's wallet 151 in the wallet service 150. However, as stated, if a virtual account number is not generated, the authentication server 120 may directly add the account number, expiration date, and CVV of the contactless card 101 to the user's wallet 151 in the wallet service 150. In such an example, the GUI depicted in FIG. 3C may be updated accordingly.

Figure 3D:
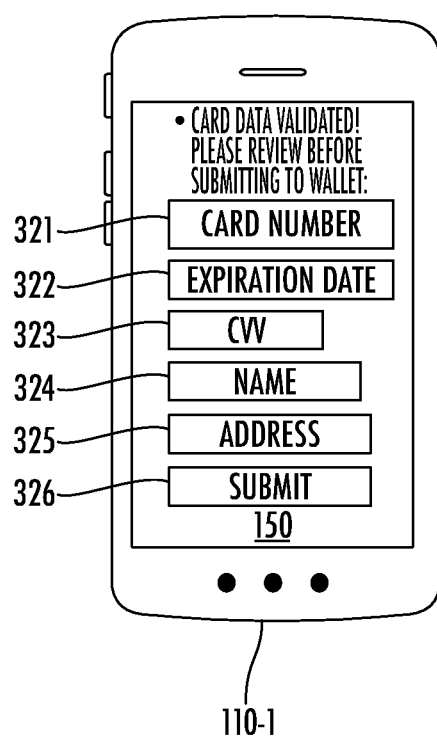

As stated, the GUI depicted in FIG. 3B may be provided by the wallet service 150 (and/or an application associated with the wallet service 150). FIG. 3D is a schematic 320 reflecting such an example. In FIG. 3D, the authentication server 120 has validated the encrypted data 105 generated by the contactless card 101 responsive to a tap of the contactless card 101 to the device 110-1. Once validated, the authentication server 120 may transmit an indication of the validation of the encrypted data 105 to the GUI provided by the wallet service 150 on the device 110-1. As shown, the GUI provided by the wallet service 150 on the device 110-1 then outputs fields 321-325. The fields 321-325 may be automatically populated with data. The populated values in fields 321-325 are examples and should not be considered limiting of the disclosure.

For example, field 321 corresponds to an account number, and may be populated to include the virtual account number generated by the VAN generator 142 and/or the account number of the contactless card 101. The account number may be obfuscated to preserve privacy. Similarly, field 322 corresponds to an expiration date, and may be populated to include the expiration date generated by the VAN generator 142 and/or the expiration date of the contactless card 101. Field 323 corresponds to CVV value and may be populated to include the CVV generated by the VAN generator 142 and/or the CVV of the contactless card 101. Field 324 corresponds to an account holder name and may be populated to include the account holder name received from the authentication server 120, VAN generator 142, and/or the contactless card 101. Field 325 corresponds to an account holder address and may be populated to include the account holder address received from the authentication server 120, VAN generator 142, and/or the contactless card 101. The user may then submit the information in populated fields 321-325 to the wallet service 150 for addition to the user's wallet 151 via the submit button 326.

As stated, the data populated in fields 321-325 may be received from the contactless card 101 responsive to a tap of the contactless card. In such embodiments, the GUI provided by the wallet service 150 on the device 110-1 may instruct the user to tap the contactless card 101 to the device 110-1 (e.g., without presenting the GUI of FIG. 3B). Responsive to a single tap of the contactless card 101, the applet 103 may generate the encrypted data 105 and transmit the encrypted data 105 to the device 110-1 along with the account number, expiration date, and CVV of the contactless card 101. The GUI provided by the wallet service 150 (and/or the account application 113) may then transmit the encrypted data 105 to the authentication server 120, which may validate the encrypted data 105. Once the GUI provided by the wallet service 150 receives an indication that the authentication server 120 validated the encrypted data 105, the values may be programmatically populated into the fields 321-325 of the GUI. In one embodiment, the account holder name and/or address are received from the applet 103 with the encrypted data 105. In another embodiment, the account holder name and/or address are received from the authentication server 120. The user may then submit the populated data via the submit button 326, which adds the data of the contactless card 101 to the wallet 151 in the wallet service 150.

FIG. 4 is a schematic 400 illustrating an example of tapping the contactless card 101 to provision a virtual account number. As shown, the account application 113 executing on a computing device 110-3 outputs a GUI for receiving parameters 106. Illustratively, the GUI includes form fields 401-403, where field 401 corresponds to an amount field, field 402 corresponds to a primary account field (e.g., the primary account holder), and field 403 corresponds to a merchant field. The form fields may be completed by the requesting user as part of a request for a virtual card number and/or by the primary account holder as part of a grant of a virtual card number. The example depicted in FIG. 4 corresponds to an embodiment where an employee completes the form fields 401-403 as part of a request to provision a subaccount. Embodiments are not limited in this context. For example, a child may use the GUI of FIG. 4 to request a subaccount authorized via the GUI of FIG. 3A.

As shown in FIG. 4, the employee has entered an amount of $300 in field 401, an example primary account of "Employer" in field 402, and an example merchant category of hardware stores in field 403. Once the employee selects the submit button 404, the account application 113 transmits a request to the primary account holder. The request may generally be approved by the primary account holder (e.g., using the GUI depicted in FIG. 3A). Although not depicted for the sake of clarity, the account application 113 on the device 110 of the primary account holder may instruct the primary account holder to tap their contactless card 101 to the device 110 to approve the request. In some embodiments, the primary account holder may add and/or modify the requested parameters, e.g., to impose a location restriction on the request. The contactless card 101 may then generate encrypted data 105, which is sent to the account application 113 on the computing device 110 of the primary account holder (e.g., the employer). The account application 113 of the primary account holder may then transmit the encrypted data 105 and parameters 106 (e.g., the values in fields 401-403 and/or indications thereof) to the authentication application 123. The authentication application 123 may then validate the encrypted data 105 and instruct the VAN generator 142 to generate a virtual account number, expiration date, and CVV that is limited to $300 and can be used at merchants in the hardware store category. The virtual account number may then be sent to the requesting device 110-3 of the subaccount holder and/or added to the digital wallet 151 of the subaccount holder.

FIG. 5 is a schematic 500 illustrating a GUI of the account application 113 for managing provisioned virtual card numbers. As shown, the GUI of the account application 113 on a computing device 110-4 lists one or more previously generated virtual card numbers associated with the primary account and one or more subaccounts. As shown, the GUI of the account application 113 allows the primary account holder to activate and/or deactivate the virtual card numbers. For example, as shown, the checkbox 501 is unchecked, thereby indicating the associated virtual card number is not activated. If, however, the user checks the checkbox 501, the account application 113 may reactivate the virtual account number. In some embodiments, the account application 113 requires the user to tap the contactless card 101 to the device 110-4 to reactivate the virtual account number (e.g., by generating encrypted data 105 that is verified by the authentication server 120, which may then add the requested funds to the reactivated virtual account number).

Similarly, the checkboxes 502-503 are checked, indicating the associated virtual card numbers are active. If the user unchecks one or more of checkboxes 502-503, the associated virtual account numbers are deactivated. In one embodiment, the account application 113 requires the user to tap the contactless card 101 to deactivate the virtual account numbers. In other embodiments, the virtual account numbers are deactivated without requiring the user tap the contactless card 101 to the device 110-4.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
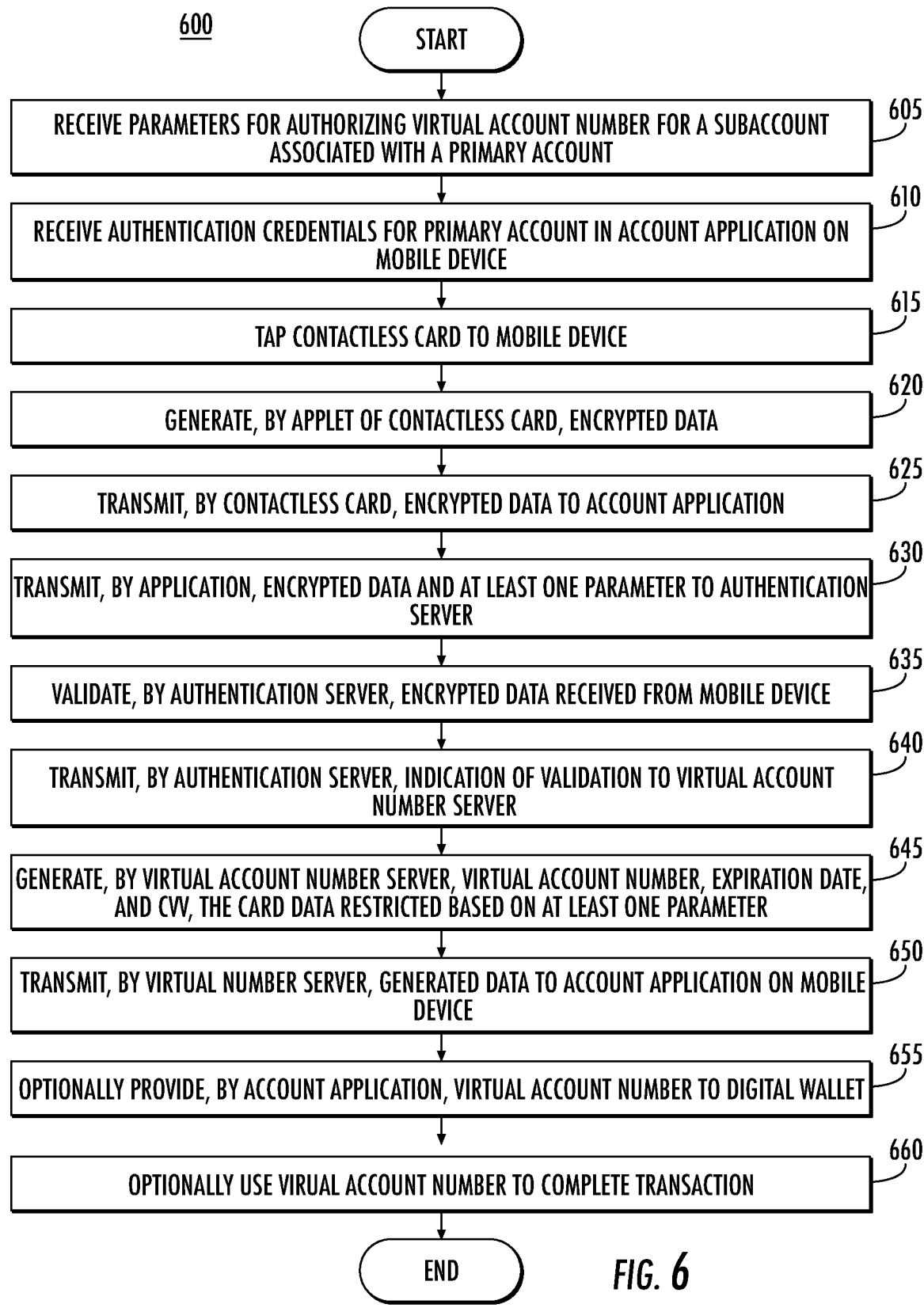
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations to use a contactless card to provision a virtual account number. Embodiments are not limited in this context.

As shown, the logic flow 600 begins at block 605, where the account application 113 receives parameters 106 for authorizing a virtual account number for a subaccount associated with a primary account. The parameters 106 may include user-defined parameters and/or parameters 106 received from the contactless card 101. The subaccount may be associated with the primary account in any way, such as an organizational relationship, familial relationship, friendship, and the like. For example, a parent may provide parameters 106 specifying to generate a $20 virtual account number for their child which is valid for one week and can be used at bookstores within 2 miles of the city center. At block 610, the account application 113 receives primary account credentials 115 to authenticate the primary account.

At block 615, a user taps the contactless card 101 to the computing device 110 to cause the contactless card 101 to generate and transmit encrypted data 105. At block 620, the applet 103 of the contactless card 101 may generate the encrypted data 105 using the private key 104, input data (e.g., the customer identifier), and a cryptographic algorithm. The applet 103 may then transmit the encrypted data 105 to the computing device 110 at block 625. At block 630, the account application 113 may transmit the encrypted data 105 received from the contactless card 101 to the authentication server 120. The account application 113 may further transmit one or more parameters 106 to the authentication server 120, e.g., the parameters received at block 605. More generally, the parameters may include the primary account identifier, subaccount identifier, amount value, any restrictions, etc.

At block 635, the authentication application 123 decrypts the encrypted data 105 using the private key 104 in the memory 122 of the authentication server 120 to validate the encrypted data 105. At block 640, the authentication application 123 transmits an indication to the VAN generator 142 specifying to generate a virtual account number, expiration date, and CVV. The authentication application 123 may further transmit the received parameters 106 and/or any data from the account data 124 to the VAN generator 142. At block 645, the VAN generator 142 generates the virtual account number, expiration date, and CVV in accordance with the parameters 106. For example, the VAN generator 142 may limit the virtual account number to $30 that can be used by the child at bookstores within 2 miles of the city center for one week. At block 650, the VAN generator 142 transmits the virtual account number, expiration date, and CVV to the computing device 110. As stated, responsive to receiving the virtual account number, expiration date, and CVV, the account application 113 and/or the OS 112 may detect the virtual account number, expiration date, and CVV and perform an operation. For example, the account application 113 and/or the OS 112 may autofill the virtual account number, expiration date, and/or CVV into one or more form fields, copy the virtual account number, expiration date, and/or CVV to a clipboard, etc.

At block 655, the account application 113 and/or the VAN generator 142 may provide the virtual account number, expiration date, and CVV to the digital wallet 151 of the subaccount holder (e.g., via the device 110 and/or the wallet service 150). Similarly, the VAN generator 142 may provide the virtual account number, expiration date, and CVV to the authentication server 120, which may store the virtual account number, expiration date, and CVV in the account data 124 (or another database for storing virtual card numbers) of the subaccount holder. At block 660, the subaccount holder optionally uses the virtual account number, expiration date, and CVV to complete a transaction. For example, the child may use the virtual account number, expiration date, and CVV to purchase $20 worth of books from a bookstore the day after the VAN generator 142 generates the virtual account number, expiration date, and CVV.

Figure 7:
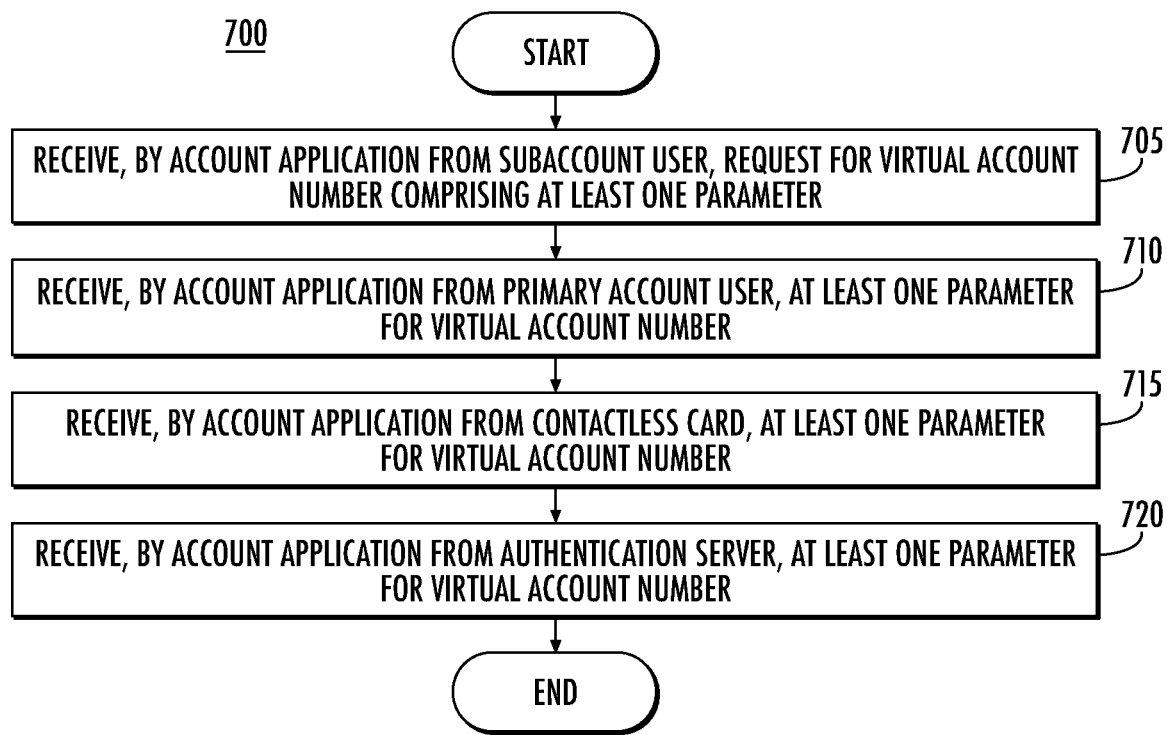
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations to receive parameters for provisioning a virtual account number using the contactless card 101. Embodiments are not limited in this context.

As shown, the logic flow 700 begins at block 705, where the account application 113 receives a request to generate a virtual account number comprising one or more parameters 106 from a subaccount user. For example, the child may request $30 from their parent at block 705. At block 710, the account application 113 may receive at least one parameter 106 from the primary account holder. For example, the parent may specify that the requested amount can only be used at bookstores 5 miles from home. At block 715, the account application 113 receives one or more parameters 106-2 from the contactless card 101. For example, the parameters 106 of the contactless card 101 may specify a valid duration of 1 week for any virtual number provisioned using the contactless card 101. At block 720, the account application 113 may receive one or more parameters 106 from the authentication server 120. For example, the account data 124 of the parent may specify a parameter 106 limiting the amount of funds for any virtual number provisioned using the contactless card 101 to a maximum of $20. Therefore, using the parameters received at blocks 705-720, the account application 113 receives parameters 106 specifying to generate a virtual account number limited to $20 in spending for one week at bookstores five miles from the home address associated with the primary account.

Figure 8:
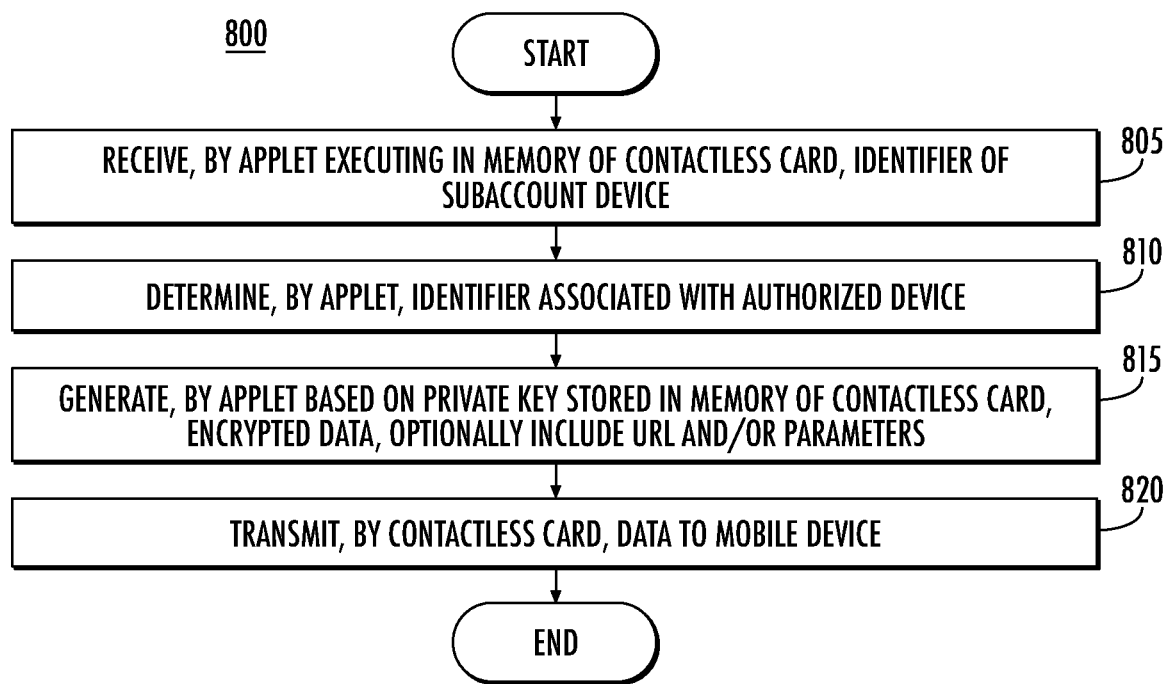
FIG. 8 illustrates an embodiment of a third logic flow.

FIG. 8 illustrates an embodiment of a logic flow 800. The logic flow 800 may be representative of some or all of the operations executed by one or more embodiments described herein. For example, the logic flow 800 may include some or all of the operations performed by the applet executing in a contactless card. Embodiments are not limited in this context.

As shown, the logic flow 800 begins at block 805, where the applet 103 executing in the memory 102 of the contactless card 101 of the primary account holder receives an identifier of a subaccount device 110. The identifier may be, for example, and without limitation, a media access control (MAC) address, unique device identifier, and/or the software fingerprint of applications installed on the computing device 110. At block 810, the applet 103 determines that the received identifier is specified as the identifier of an authorized device of the primary account holder. For example, the applet 103 may find a matching identifier in the memory 102 that indicates the device is authorized by the primary account holder. At block 815, the applet 103 generates encrypted data 105 based on the private key 104. The applet 103 may further generate a URL that includes the encrypted data 105 as a parameter, where the URL is directed to the authentication server. The applet 103 may further include any parameters 106-2 stored in the memory of the contactless card 101. The applet 103 may then transmit the encrypted data 105, URL, and/or parameters 106-2 to the computing device 110 of the subaccount holder.

Figure 9:
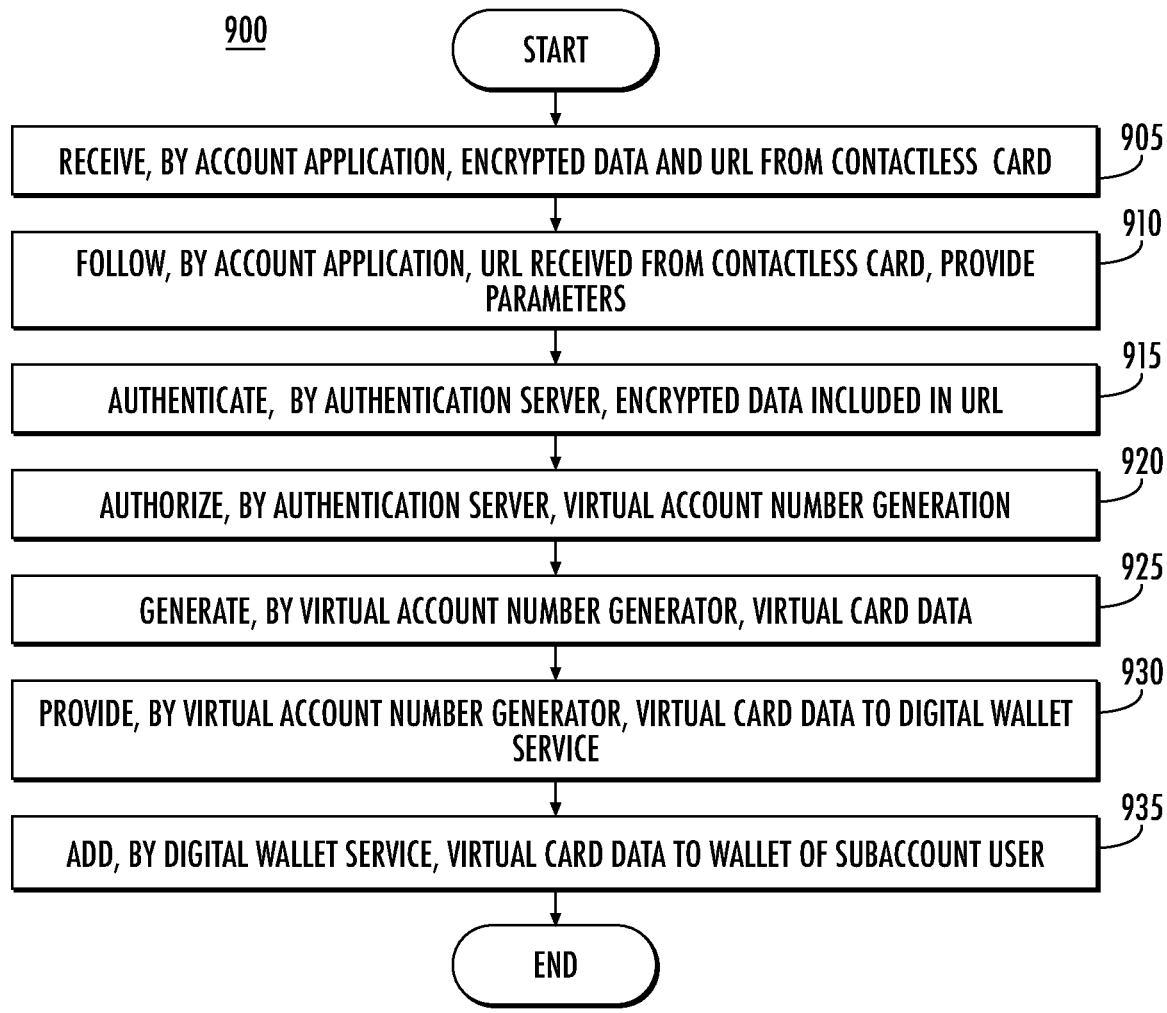
FIG. 9 illustrates an embodiment of a fourth logic flow.

FIG. 9 illustrates an embodiment of a logic flow 900. The logic flow 900 may be representative of some or all of the operations executed by one or more embodiments described herein. For example, the logic flow 900 may include some or all of the operations performed by the account application 113 to provision a virtual account number. Embodiments are not limited in this context.

As shown, the logic flow 900 begins at block 905, where the account application 113 receives encrypted data 105 and a URL from the contactless card. In one embodiment, the encrypted data 105 is a parameter of the URL. In some embodiments, the account application 113 and/or the applet 103 may encode the encrypted data 105 into an encoding format compatible with URLs. At block 910, the account application 113 and/or a web browser on the computing device 110 may follow the URL, which may be directed to the authentication server 120 and/or the authentication application 123. As part of following the URL, the account application 113 may provide parameters 106 for generating a virtual account number for a subaccount holder.

At block 915, the authentication application 123 authenticates the encrypted data 105 included as a parameter in the URL. If the encrypted data is encoded, the authentication application 123 may decode the encrypted data 105. As stated, to authenticate the encrypted data 105, the authentication application 123 decrypts the encrypted data using the private key 104. At block 920, the authentication application 123 transmits an indication to the VAN generator 142 authorizing the generation of a virtual account number, expiration date, and CVV. The authentication application 123 may further provide the parameters 106 to the VAN generator 142 to allow the VAN generator 142 to implement any restrictions on the virtual account number (e.g., amount restrictions, time restrictions, location restrictions, merchant restrictions, etc.). The VAN generator 142 may generate the virtual card data comprising the virtual account number, expiration date, and CVV (and any restrictions) at block 925.

At block 930, the VAN generator 142 provides the generated virtual account number to an API of the digital wallet service 150. The VAN generator 142 may further provide an indication of the digital wallet 151 of the subaccount holder, which may be received from the account data 142. At block 935, the digital wallet service 150 adds the virtual account number, expiration date, and CVV to the digital wallet 151 of the subaccount holder. The subaccount holder may then use the virtual account number via the digital wallet 151 to pay for transactions.

Figure 10:
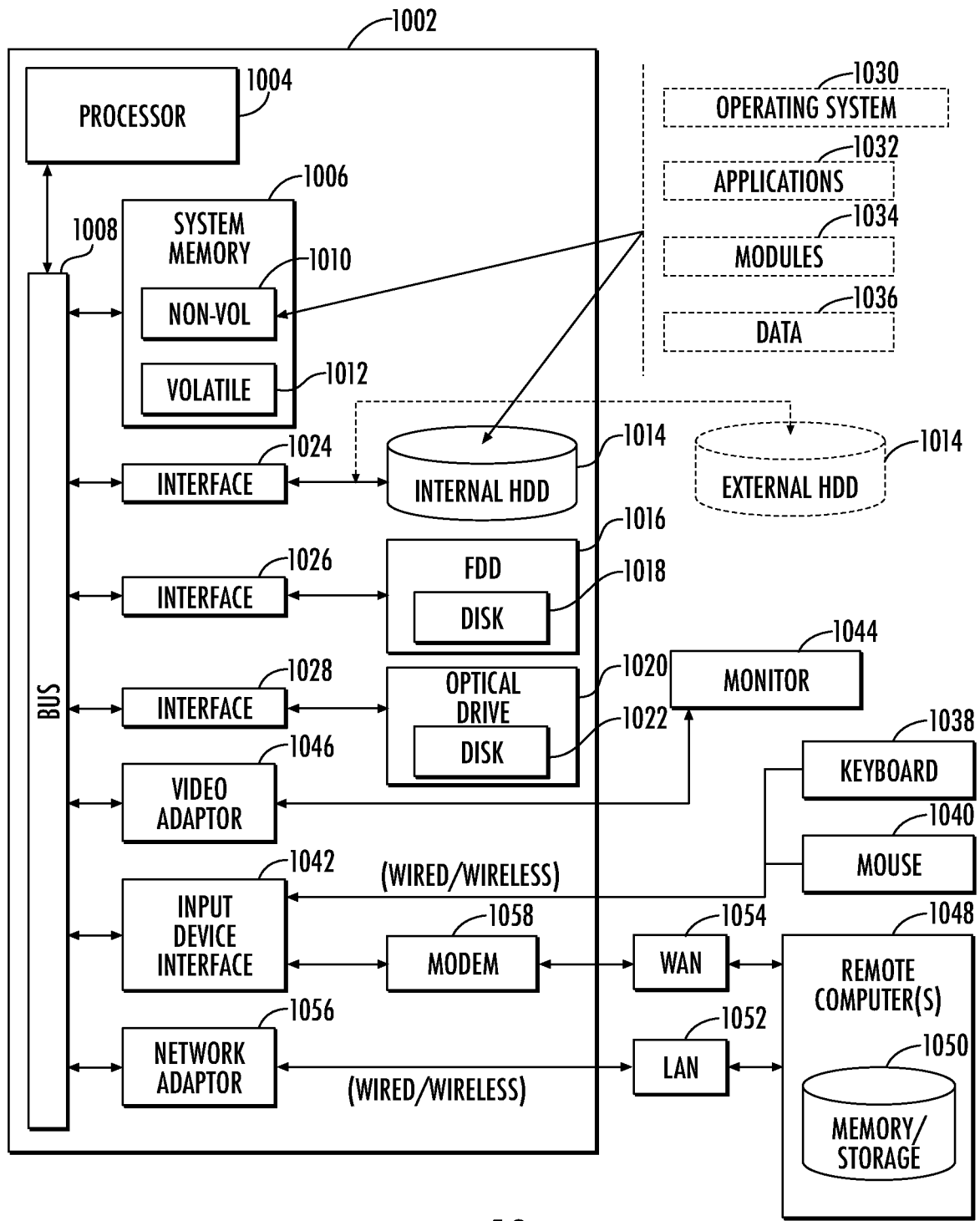
FIG. 10 illustrates an embodiment of a computing architecture.

FIG. 10 illustrates an embodiment of an exemplary computing architecture 1000 comprising a computing system 1002 that may be suitable for implementing various embodiments as previously described. In various embodiments, the computing architecture 1000 may comprise or be implemented as part of an electronic device. In some embodiments, the computing architecture 1000 may be representative, for example, of a system that implements one or more components of the system 100. In some embodiments, computing system 1002 may be representative, for example, of the contactless card 101, computing devices 110, authentication server 120, virtual account number server 140, and/or the wallet services 150 of the system 100. The embodiments are not limited in this context. More generally, the computing architecture 1000 is configured to implement all logic, applications, systems, methods, apparatuses, and functionality described herein with reference to FIGS. 1-9.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1002 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1002.

As shown in FIG. 10, the computing system 1002 comprises a processor 1004, a system memory 1006 and a system bus 1008. The processor 1004 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 1004.

The system bus 1008 provides an interface for system components including, but not limited to, the system memory 1006 to the processor 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computing system 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies. The computing system 1002 is generally is configured to implement all logic, systems, methods, apparatuses, and functionality described herein with reference to FIGS. 1-9.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100, e.g., the applet 103, private keys 104, encrypted data 105, parameters 106, operating system 112, account application 113, the authentication application 123, the wallet services 150, and/or digital wallets 151.

A user can enter commands and information into the computing system 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computing system 1002. In addition to the monitor 1044, a computer typically includes other peripheral output devices, such as speakers, printers, and so forth.

The computing system 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computing system 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 1052 and the WAN 1054.

When used in a LAN networking environment, the computing system 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computing system 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computing system 1002, or portions thereof, can be stored in the remote memory/storage device 1050. It will be appreciated that the network connections shown are exemplary and other means of establishing a communications link between the computers can be used.

The computing system 1002 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11A:
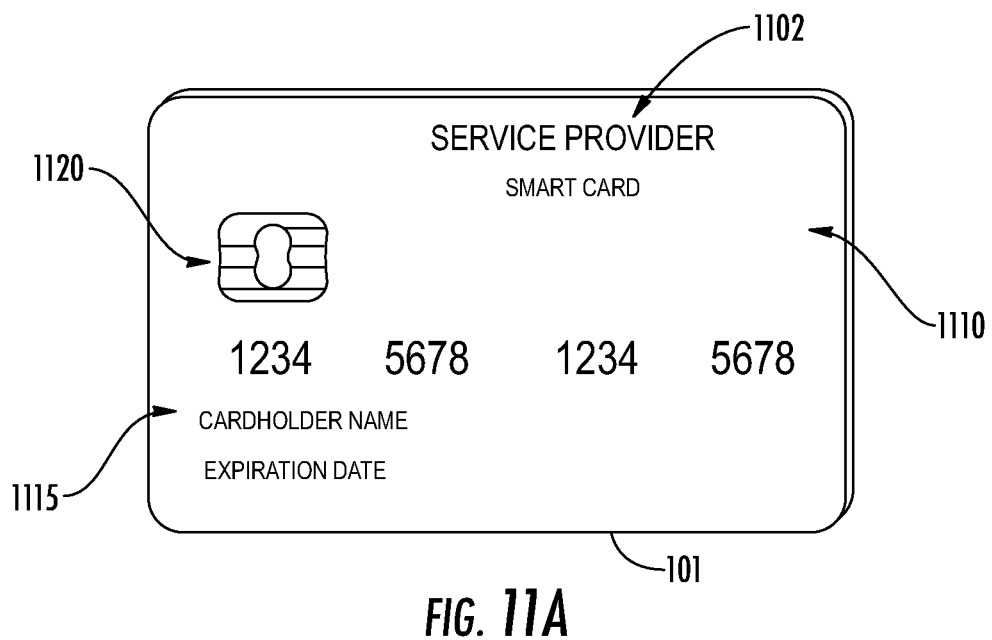
FIGS. 11A-11B illustrate an example contactless card.

FIG. 11A illustrates a contactless card 101, which may comprise a payment card, such as a credit card, debit card, and/or a gift card. As shown, the contactless card 101 may be issued by a service provider 1102 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 1110, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 1115 displayed on the front and/or back of the card, and a contact pad 1120. The contact pad 1120 may be configured to establish contact with another communication device, such as the mobile devices 110, a user device, smart phone, laptop, desktop, or tablet computer. The contactless card 101 may also include processing circuitry, antenna and other components not shown in FIG. 11A. These components may be located behind the contact pad 1120 or elsewhere on the substrate 1110. The contactless card 101 may also include a magnetic strip or tape, which may be located on the back of the card (not shown in FIG. 11A).

Figure 11B:
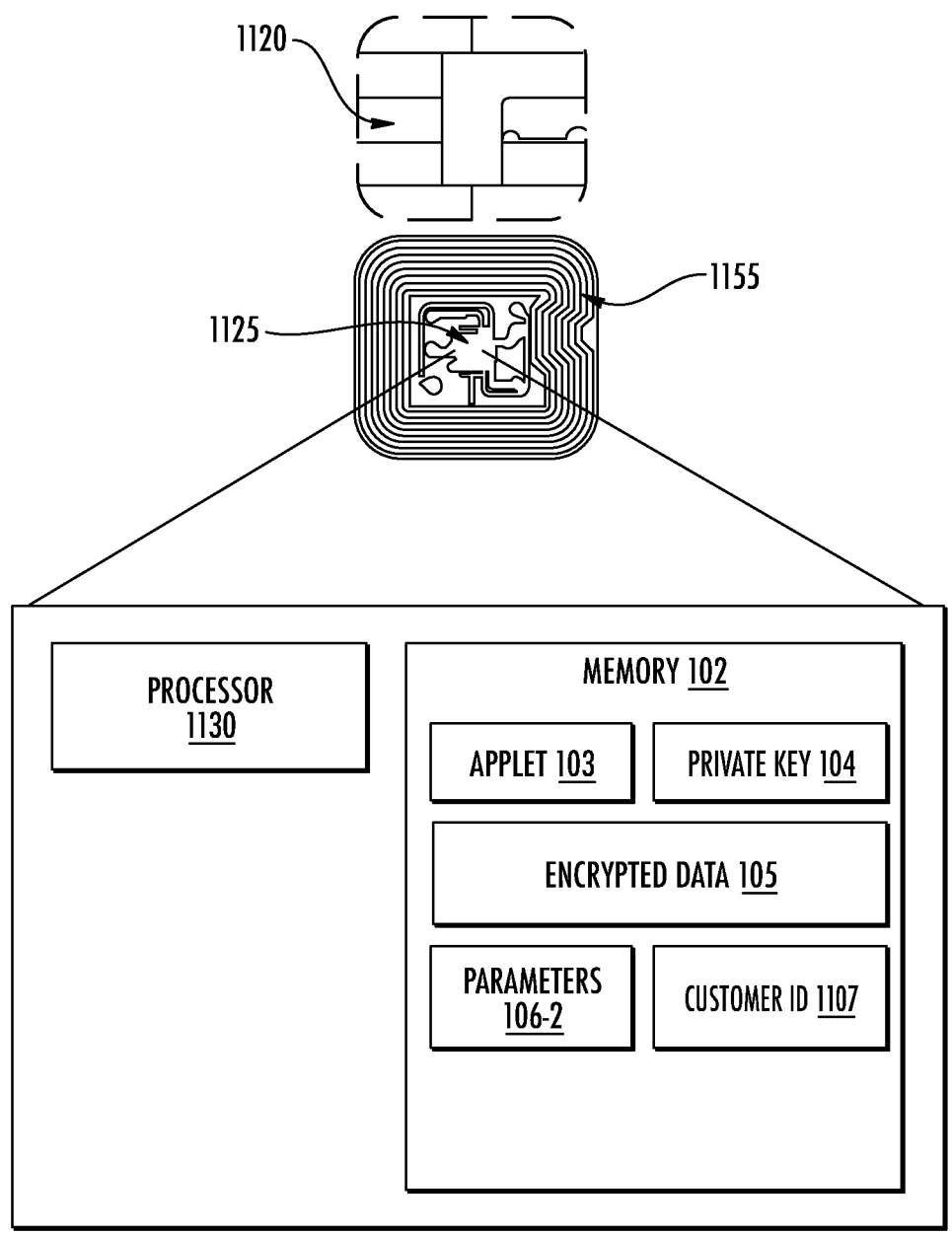

As illustrated in FIG. 11B, the contact pad 1120 of contactless card 101 may include processing circuitry 1125 for storing and processing information, including a microprocessor 1130 and the memory 102. It is understood that the processing circuitry 1125 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 103, the private key 104, the encrypted data 105, the parameters 106-2, and one or more customer (or user) identifiers (IDs) 1107. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 1107 may comprise a unique alphanumeric identifier assigned to a user of the contactless card 101, and the identifier may distinguish the user of the contactless card from other contactless card users. In some examples, the customer ID 1107 may identify both a customer and an account assigned to that customer and may further identify the contactless card associated with the customer's account. In some embodiments, the applet 103 may use the customer ID 1107 as input to a cryptographic algorithm with the private key 1108 to generate the encrypted data 108.

The processor and memory elements of the foregoing exemplary embodiments are described with reference to the contact pad, but the present disclosure is not limited thereto. It is understood that these elements may be implemented outside of the pad 1120 or entirely separate from it, or as further elements in addition to processor 1130 and memory 102 elements located within the contact pad 1120.

In some examples, the contactless card 101 may comprise one or more antennas 1155. The one or more antennas 1155 may be placed within the contactless card 101 and around the processing circuitry 1125 of the contact pad 1120. For example, the one or more antennas 1155 may be integral with the processing circuitry 1125 and the one or more antennas 1155 may be used with an external booster coil. As another example, the one or more antennas 1155 may be external to the contact pad 1120 and the processing circuitry 1125.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 1155, processing circuitry 1125, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the card reader 119 of the device 110), and produce an NDEF message that comprises a cryptographically secure OTP encoded as an NDEF text tag.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   a card reader;
   a processor circuit; and
   a memory storing instructions which when executed by the processor circuit, cause the processor circuit to:
   receive a request for authorizing a virtual account number for a subaccount associated with a primary account;
   receive, by an application executing on the processor circuit, authentication credentials for the primary account;
   receive, by the card reader of the apparatus from an applet of a contactless card, a uniform resource locator (URL) comprising at least one parameter for the virtual account number and encrypted data, the contactless card associated with the primary account, the at least one parameter and the encrypted data comprising respective parameters of the URL, the encrypted data based on a diversified key and a cryptographic algorithm, the diversified key based on an identifier of the primary account, a counter value, and a private key, the at least one parameter comprising an amount parameter and a location parameter for the virtual account number, wherein the URL comprises a universal link URL directed to a page of the application;
   open the page of the application responsive to receiving the URL;
   receive, via the page of the application, an additional parameter for the virtual account number;

transmit, by the application, the encrypted data to an authentication server, the authentication server associated with an issuer of the contactless card;
receive, by the application, an indication specifying the authentication server decrypted the encrypted data based on the cryptographic algorithm and the diversified key;
provide, by the application to the server at the URL and responsive to receiving the indication specifying the authentication server decrypted the encrypted data, the amount parameter, the additional parameter, and the location parameter for the virtual account number; and
receive, by the application, a virtual account number for the subaccount generated by a virtual card number server, the virtual account number restricted to a spending limit based on the amount parameter and one or more locations based on the location parameter.

2. The apparatus of claim 1, the memory storing instructions which when executed by the processor circuit, cause the processor circuit to:
transmit, by the card reader prior to receiving the encrypted data, a device identifier of the apparatus to the contactless card associated with the primary account, wherein the application transmits the device identifier to the server with the encrypted data; and
provide, by the application, the virtual account number to an application programming interface (API) of a digital wallet service to add the virtual account number to a digital wallet of a user associated with the subaccount.

3. The apparatus of claim 2, wherein the device identifier of the apparatus comprises one or more of: (i) a medium access control (MAC) address of the card reader, and (ii) a software fingerprint of the apparatus generated based on a plurality of applications installed on the apparatus, wherein the encrypted data is encoded according to an encoding format compatible with the URL.

4. The apparatus of claim 3, wherein the virtual account number is further received based on the device identifier being a known identifier associated with the primary account, the memory storing instructions which when executed by the processor circuit, cause the processor circuit to:
receive, by the application, input specifying to deactivate the virtual account number; and
deactivate, by the application, the virtual account number based on the received input.

5. The apparatus of claim 4, the memory storing instructions which when executed by the processor circuit, cause the processor circuit to:
receive, by the application, input specifying to reactivate the virtual account number;
receive, by the application, a second encrypted data from the contactless card;
transmit, by the application, the second encrypted data to the authentication server;
receive, by the application, an indication specifying the authentication server decrypted the second encrypted data; and
reactivate, by the application, the virtual account number based on the input specifying to reactivate the virtual account number and the indication specifying the authentication server decrypted the second encrypted data.

6. The apparatus of claim 1, wherein
the additional parameter comprises a time parameter specifying a time limit for using the virtual account number and a merchant parameter specifying one or more merchants where the virtual account number can be used.

7. The apparatus of claim 1, the memory storing instructions which when executed by the processor circuit, cause the processor circuit to:
output, by the application on a display, a plurality of virtual account numbers provided to a plurality of subaccounts associated with the primary account;
receive selection of one of the plurality of virtual account numbers, the selected one of the plurality of virtual account numbers comprising an inactive virtual account number; and
activate the selected one of the plurality of virtual account numbers, the activating to provide an additional amount of funds to the activated virtual account number.

8. A method, comprising:
receiving a request for authorizing a virtual account number for a subaccount associated with a primary account;
receiving, by an application executing on a processor circuit of a first device, authentication credentials for the primary account;
receiving, by a card reader of the first device from an applet of a contactless card, a uniform resource locator (URL) comprising at least one parameter for the virtual account number and encrypted data, the contactless card associated with the primary account, the at least one parameter and the encrypted data comprising respective parameters of the URL, the encrypted data generated by the applet using a cryptographic algorithm and a diversified key, the diversified key and based on an identifier of the primary account, a counter value, and a private key stored in a memory of the contactless card, the at least one parameter comprising an amount parameter and a location parameter for the virtual account number, wherein the URL comprises a universal link URL directed to a page of the application;
opening the page of the application responsive to receiving the URL;
receiving, via the page of the application, an additional parameter for the virtual account number;
transmitting, by the application, the encrypted data to an authentication server at the URL, the authentication server associated with an issuer of the contactless card;
receiving, by the application, an indication specifying the authentication server decrypted the encrypted data based on the cryptographic algorithm and instances of the diversified key and the counter value stored by the authentication server;
providing, by the application to the server and responsive to receiving the indication specifying the authentication server decrypted the encrypted data, the amount parameter, the additional parameter, and the location parameter for the virtual account number; and
receiving, by the application based on the decryption of the encrypted data, a virtual account number for the subaccount generated by a virtual card number server, the virtual account number restricted to a spending limit based on the amount parameter and one or more locations based on the location parameter.

9. The method of claim 8, further comprising:
providing, by the application, the virtual account number to an application programming interface (API) of a digital wallet service to add the virtual account number to a digital wallet of a user associated with the subaccount, wherein the applet encodes the encrypted data according to an encoding format compatible with the URL, wherein the server decodes the encoded encrypted data prior to decrypting the encrypted data.

10. The method of claim 8, wherein
the additional parameter comprises a time parameter specifying a time limit for using the virtual account number and a merchant parameter specifying one or more merchants where the virtual account number can be used.

11. The method of claim 10, the method further comprising:
receiving, by the authentication server from an instance of the application executing on a processor circuit of a second device associated with the primary account, encrypted data received by the second device from the applet of the contactless card associated with the primary account; and
verifying, by the authentication server, the encrypted data received by the second device from the applet of the contactless card associated with the primary account.

12. The method of claim 8, further comprising:
transmitting, by the card reader prior to receiving the encrypted data, a device identifier of the first device to the contactless card associated with the primary account, the device identifier of the first device comprising one or more of: (i) a medium access control (MAC) address of the card reader, (ii) and a software fingerprint of the first device generated based on a plurality of applications installed on the first device;
determining, by the applet, that the device identifier is a known identifier associated with the primary account;
transmitting, by the application, the device identifier of the first device to the server; and
determining, by the server, that the device identifier of the first device is the known identifier associated with the primary account prior to verifying the encrypted data.

13. The method of claim 8, wherein a communications interface of the contactless card is configured to support at least one of near field communication (NFC), Bluetooth, and Wi-Fi, the method further comprising:
outputting, by the application on a display, a plurality of virtual account numbers provided to a plurality of subaccounts associated with the primary account;
receiving selection of one of the plurality of virtual account numbers, the selected one of the plurality of virtual account numbers comprising an inactive virtual account number; and
activating the selected one of the plurality of virtual account numbers, the activating to provide an additional amount of funds to the activated virtual account number.

14. A non-transitory computer-readable storage medium having computer-readable program code embodied therewith, the computer-readable program code executable by a processor circuit of a first device to cause the processor circuit to:
receive a request for authorizing a virtual account number for a subaccount associated with a primary account;
receive, by an application executing on the processor circuit, authentication credentials for the primary account;
receive, by a card reader from an applet of a contactless card, a uniform resource locator (URL) comprising at least one parameter for the virtual account number and encrypted data, the contactless card associated with the primary account, the at least one parameter and the encrypted data comprising respective parameters of the URL, the encrypted data generated by the applet using a cryptographic algorithm and a diversified key, the diversified key and based on an identifier of the primary account, a counter value, and a private key stored in a memory of the contactless card, the at least one parameter comprising an amount parameter and a location parameter for the virtual account number, wherein the URL comprises a universal link URL directed to a page of the application;
open the page of the application responsive to receiving the URL;
receive, via the page of the application, an additional parameter for the virtual account number;
transmit, by the application, the encrypted data to an authentication server at the URL, the authentication server associated with an issuer of the contactless card;
receive, by the application, an indication specifying the authentication server decrypted the encrypted data based on the cryptographic algorithm and the diversified key;
provide, by the application to the server at the URL and responsive to receiving the indication specifying the authentication server decrypted the encrypted data, the amount parameter, the additional parameter, and the location parameter for the virtual account number; and
receive, by the application, a virtual account number for the subaccount generated by a virtual card number server, the virtual account number restricted to a spending limit based on the amount parameter and one or more locations based on the location parameter.

15. The non-transitory computer-readable storage medium of claim 14, further comprising computer-readable program code executable by the processor circuit to cause the processor circuit to:
transmit, by the card reader prior to receiving the encrypted data, a device identifier of the first device to the contactless card associated with the primary account, wherein the application transmits the device identifier to the server with the encrypted data; and
provide, by the application, the virtual account number to an application programming interface (API) of a digital wallet service to add the virtual account number to a digital wallet of a user associated with the subaccount.

16. The non-transitory computer-readable storage medium of claim 15, wherein the first device is associated with the subaccount, wherein the device identifier comprises one or more of: (i) a medium access control (MAC) address of the card reader, and (ii) a software fingerprint of the first device generated based on a plurality of applications installed on the first device, wherein the encrypted data is encoded according to an encoding format compatible with the URL.

17. The non-transitory computer-readable storage medium of claim 16, storing instructions which when executed by the authentication server cause the authentication server to:
receive, from an instance of the application executing on a processor circuit of a second device associated with the primary account, encrypted data received by the second device from the applet of the contactless card associated with the primary account; and verify the encrypted data received by the second device from the applet of the contactless card associated with the primary account.

18. The non-transitory computer-readable storage medium of claim 14, wherein
the additional parameter comprises a time parameter specifying a time limit for using the virtual account number and a merchant parameter specifying one or more merchants where the virtual account number can be used.

19. The method of claim 8, further comprising:
receiving, by the application, input specifying to deactivate the virtual account number;
deactivating, by the application, the virtual account number based on the received input
receiving, by the application, input specifying to reactivate the virtual account number;
receiving, by the application, a second encrypted data from the contactless card;
transmitting, by the application, the second encrypted data to the authentication server;
receiving, by the application, an indication specifying the authentication server decrypted the second encrypted data; and
reactivating, by the application, the virtual account number based on the input specifying to reactivate the virtual account number and the indication specifying the authentication server decrypted the second encrypted data.

20. The non-transitory computer-readable storage medium of claim 14, further comprising computer-readable program code executable by the processor circuit to cause the processor circuit to:
receive, by the application, input specifying to deactivate the virtual account number;
deactivate, by the application, the virtual account number based on the received input receive, by the application, input specifying to reactivate the virtual account number;
receive, by the application, a second encrypted data from the contactless card;
transmit, by the application, the second encrypted data to the authentication server;
receive, by the application, an indication specifying the authentication server decrypted the second encrypted data; and
reactivate, by the application, the virtual account number based on the input specifying to reactivate the virtual account number and the indication specifying the authentication server decrypted the second encrypted data.

* * * * *